United States Patent
Hoffmann et al.

(10) Patent No.: US 12,536,480 B2
(45) Date of Patent: Jan. 27, 2026

(54) METHOD FOR DETERMINING A TREATMENT SCHEDULE FOR TREATING A FIELD

(71) Applicant: BASF AGRO TRADEMARKS GMBH, Ludwigshafen (DE)

(72) Inventors: Holger Hoffmann, Cologne (DE); Umit Baran Ilbasi, Sao Paulo (BR); Matthias Gerber, Ludwigshafen (DE)

(73) Assignee: BASF AGRO TRADEMARKS GMBH, Ludwigshafen am Rhein (DE)

( * ) Notice: Subject to any disclaimer, the term of this patent is extended or adjusted under 35 U.S.C. 154(b) by 250 days.

(21) Appl. No.: 18/271,770

(22) PCT Filed: Jan. 13, 2022

(86) PCT No.: PCT/EP2022/050653
§ 371 (c)(1),
(2) Date: Jul. 11, 2023

(87) PCT Pub. No.: WO2022/152796
PCT Pub. Date: Jul. 21, 2022

(65) Prior Publication Data
US 2024/0078479 A1   Mar. 7, 2024

(30) Foreign Application Priority Data
Jan. 14, 2021   (EP) ................... 21151577

(51) Int. Cl.
*G06Q 10/0631*   (2023.01)
*G06Q 10/0635*   (2023.01)
*G06Q 50/02*   (2012.01)

(52) U.S. Cl.
CPC ..... *G06Q 10/0631* (2013.01); *G06Q 10/0635* (2013.01); *G06Q 50/02* (2013.01)

(58) Field of Classification Search
CPC ............. G06Q 10/063; G06Q 10/0631; G06Q 10/0635; G06Q 50/02
See application file for complete search history.

(56) References Cited

U.S. PATENT DOCUMENTS

| | | | |
|---|---|---|---|
| 2020/0273117 A1* | 8/2020 | Stenzel | G06Q 10/04 |
| 2022/0051350 A1* | 2/2022 | Miller | G06Q 50/02 |
| 2024/0020965 A1* | 1/2024 | Johns | G06V 20/00 |

FOREIGN PATENT DOCUMENTS

WO   2020/079231 A1   4/2020

OTHER PUBLICATIONS

A. Jones, U. Ali and M. Egerstedt, "Optimal Pesticide Scheduling in Precision Agriculture," 2016 ACM/IEEE 7th International Conference on Cyber-Physical Systems (ICCPS), Vienna, Austria, 2016, pp. 1-8. (Year: 2016).*

(Continued)

*Primary Examiner* — William S Brockington, III
(74) *Attorney, Agent, or Firm* — ArentFox Schiff LLP

(57) ABSTRACT

Computer-implemented method for generating control data configured to be used or usable in an agricultural equipment for treating a field, comprising the following steps: (S10) providing crop data, wherein the crop data comprise information about an agricultural crop species providing crop data grown or sown or planned to be grown or sown in a field; (S20) providing field data, wherein the field data comprise information about the field; (S30)—optionally—providing historic treatment data, (S40)—optionally—providing environmental data, (S50) at least based on the crop data and on the field data, initiating and/or performing data processing in at least one database and/or database system, (S60) determining the organism-specific risk based on the result of the data processing, (S70) providing and/or determining the organism-specific threshold, (S80) determining, based on the organism-specific risk and the organism-spe- (Continued)

cific threshold and based on the data processing in at least one treatment-related database, at least two treatment schedules capable of targeting the at least one organism, (S90) ranking the at least two treatment schedules, based on one or more of the specific statistics (Q1) to (Q28): (S100) outputting the ranked list of the at least two treatment schedules, (S110) generating control data configured to be used or usable in an agricultural equipment, wherein the control data is based on the highest ranked treatment schedule from the ranked list, or a treatment schedule selected by a user from the ranked list.

16 Claims, 3 Drawing Sheets

(56) References Cited

OTHER PUBLICATIONS

International Search Report and Written Opinion of International Application No. PCT/EP2022/050653 mailed May 4, 2022, 10 pgs.

* cited by examiner

METHOD FOR DETERMINING A TREATMENT SCHEDULE FOR TREATING A FIELD

FIELD OF THE INVENTION

The present invention relates to a method for determining a treatment schedule for treating an agricultural field; the use of such a treatment schedule for providing control data for controlling an agricultural equipment.

BACKGROUND OF THE INVENTION

Using more than one crop protection product in different time windows, i.e. by applying a first product at day 1 and a second product in day 2, can be useful for targeting more than one organism such as weeds, fungi or insects, can enhance the activity of certain products, and can widen the range of treatments.

However, in practice a user faces several uncertainties when deciding which products to be used at which time window. One of the uncertainties is given by the fact that for each product an allowed/applicable application time and application range has to be considered. Moreover, when applying different products at different time windows, it has also to be considered for which agricultural crops, varieties/traits, weeds and/or pathogens a respective treatment schedule can be used in a most efficient manner. The goal in this respect is to select a treatment schedule against a present or an expected organism (e.g. weed/pathogen) spectrum, with sufficient efficacy but lowest environmental and economic impact. Another goal in this respect is to select a treatment schedule which also has the highest flexibility and adaptability, for example a treatment schedule in which the time window of the first treatment can be postponed to later dates so that a first treatment can be potentially merged with a second treatment. However, the mentioned factors lead to a large number of possible treatment schedules across a season when considering the combinations of pesticide products at a given application time and rotating these across the season.

In view of this, it is found that a further need exists to simplify such a selection of treatment schedules.

SUMMARY OF THE INVENTION

In the view of the above, it is an object of the present invention to provide a method for determining a treatment schedule and ranking at least two treatment schedules, which can be easily applied by a user and by which a respective treatment schedule recommendation is provided to a user, or by which the highest ranked treatment schedule is provided to a user.

These and other objects, which become apparent upon reading the following description, are solved by the subject matter of the independent claims. The dependent claims refer to preferred embodiments of the invention.

According to a first aspect of the present invention, the present invention relates to: Computer-implemented method for determining an organism-specific risk, comprising the following steps:
  (S10) providing crop data, wherein the crop data comprise information about an agricultural crop species grown or sown or planned to be grown or sown in a field;
  (S20) providing field data, wherein the field data comprise information about the field;
  (S30)—optionally—providing historic treatment data, wherein the historic data comprise information about historic presence of the organism in the field or in the geographic region in which the field is located in the field, about treatment time, treatment-related parameters, organism control rate of treatments occurring or planned in the past,
  (S40)—optionally—providing environmental data, wherein the environmental data comprise information about weather, soil, crop stress, biodiversity requirements, regulatory data, and other environmental factors,
  (S50) at least based on the crop data and on the field data, initiating and/or performing data processing in at least one database and/or database system containing
  (i) data related to crop data,
  (ii) data related to field data,
  (iii) optionally data related to historic treatment data, and
  (iv) optionally data related to environmental data,
  (S60) determining the organism-specific risk based on the result of the data processing, wherein the organism-specific risk is the time-related occurrence probability of at least one organism present or expected to be present in a specific field,
  (S70) optionally providing and/or determining the organism-specific threshold, wherein the organism-specific threshold is a reference value of the organism-specific risk and wherein at least one treatment is required in case the organism-specific risk exceeds the organism-specific threshold,
  (S75) optionally determining the time window in which the organism-specific risk will exceed the organism-specific threshold.

According to another aspect of the present invention, the present invention relates to:
  A computer-implemented method for determining at least one treatment schedule for treating a field, comprising the following steps:
  (S10) providing crop data, wherein the crop data comprise information about an agricultural crop species grown or sown or planned to be grown or sown in a field;
  (S20) providing field data, wherein the field data comprise information about the field;
  (S30)—optionally—providing historic treatment data, wherein the historic data comprise information about historic presence of the organism in the field or in the geographic region in which the field is located in the field, about treatment time, treatment-related parameters, organism control rate of treatments occurring or planned in the past,
  (S40)—optionally—providing environmental data, wherein the environmental data comprise information about weather, soil, crop stress, biodiversity requirements, regulatory data, and other environmental factors,
  (S50) at least based on the crop data and on the field data, initiating and/or performing data processing in at least one database and/or database system containing
  (i) data related to crop data,
  (ii) data related to field data,
  (iii) optionally data related to historic treatment data, and
  (iv) optionally data related to environmental data,
  (S60) determining the organism-specific risk based on the result of the data processing, wherein the organism-specific risk is the time-related occurrence probability of at least one organism present or expected to be present in a specific field, (S70) providing and/or determining the organism-specific threshold, wherein the organism-specific threshold is a reference value of the organism-specific risk and wherein at least one treatment is required in case the organism-specific risk exceeds the organism-specific threshold, (S80) determining, based on the organism-specific risk and the organism-specific threshold and based on the data processing in at least one treatment-related database, at least one treatment schedule capable of targeting the at least one organism, wherein the treatment schedule comprises:

(A) at least one treatment in a field, and
(B) at least one time window for each treatment, and
(C) at least one agricultural method and/or product used for each treatment.

According to another aspect of the present invention, the present invention relates to: Computer-implemented method for determining a ranked list of at least two treatment schedules for treating a field, comprising the following steps:

(S10) providing crop data, wherein crop data comprise information about an agricultural crop species grown or sown or planned to be grown or sown in a field;

(S20) providing field data, wherein field data comprise information about the field (including its geographic position and topographic characteristics);

(S30)—optionally—providing historic treatment data, wherein historic data comprise information about historic presence of the organism in the field or in the geographic region in which the field is located in the field, about treatment time, treatment-related parameters, organism control rate of treatments occurring or planned in the past, (S40)—optionally—providing environmental data, wherein the environmental data comprise information about weather, soil, crop stress, biodiversity requirements, regulatory data, and other environmental factors, (S50) at least based on the crop data and on the field data, initiating and/or performing data processing in at least one database and/or database system containing
(i) data related to crop data,
(ii) data related to field data,
(iii) optionally data related to historic treatment data, and
(iv) optionally data related to environmental data, (S60) determining the organism-specific risks based on the result of the data processing, wherein the organism-specific risk is the time-related occurrence probability of at least one organism present or expected to be present in a specific field, (S70) providing and/or determining the organism-specific threshold, wherein the organism-specific threshold is a reference value of the organism-specific risk and wherein at least one treatment is required in case the organism-specific risk exceeds the organism-specific threshold, (S80) determining, based on the organism-specific thresholds and the organism-specific risks and based on the data processing in at least one treatment-related database, at least two treatment schedules capable of targeting the at least one organism (preferably with an efficacy above an efficacy threshold),
wherein the treatment schedule comprises:

(A) at least one treatment in a field, and
(B) at least one time window for each treatment, and
(C) at least one agricultural method and/or product used for each treatment.

(S90) ranking the at least two treatment schedules, based on one or more of the following statistics (Q1) to (Q28):

(Q1) Minimized number of treatments required,
(Q2) Minimized number of products applied
(Q3) Minimized number of crop protection products and/or of active ingredients applied,
(Q4) Minimized total dose or total amount of products,
(Q5) Minimized total dose or total amount of crop protection products,
(Q6) Minimized number of agricultural equipment required,
(Q7) Minimized total use time of agricultural equipment required,
(Q8) Minimized number of application methods applied,
(Q9) Minimized number of days in which treatments are conducted,
(Q10) Minimized total time in which treatments are conducted,
(Q11) Minimized treatment frequency index,
(Q12) Minimized environmental load (e-load) index,
(Q13) Minimized impact to beneficial organisms,
(Q14) the number of priority organisms targeted with an efficacy above a defined threshold, wherein in an example, the defined threshold is above 80% and wherein in an example this defined threshold represents the most weighted statistic per treatment schedule;
(Q15) the number of priority organisms targeted with an efficacy above a defined first threshold weighted or combined with the number of non-priority organisms targeted with an efficacy above a defined second threshold,
(Q16) the number of all organisms targeted with an efficacy above a defined threshold;
(Q17) maximum efficacy achieved or expected to be achieved across organisms by a given crop protection product;
(Q18) the fraction of crop protection product in the treatment schedule of known preferred usage at the time of application;
(Q19) the expected or achieved efficacy sum of all crop protection products in the treatment schedule for priority organisms;
(Q20) the expected or achieved efficacy sum of all crop protection products in the treatment schedule for all organisms;
(Q21) if applicable, the average expected control of residual efficacy duration in soil; and/or
(Q22) an index accounting for repeating the mode of action and/or active ingredient compared to previous applications,
(Q23) the duration of the at least one time window for each treatment,
(Q24) the postpone-ability of the at least one time window for each treatment,
(Q25) the prepone-ability of the at least one time window for each treatment,
(Q26) in case the corresponding treatment schedule comprises at least two treatments, the flexibility of leaving out one of the at least two treatments,
(Q27) degree of independency of the efficacy of the treatment schedule from previous or subsequent treatments, (Q28) degree of independency of the efficacy of the treatment schedule from environmental and/or weather conditions, (S100) outputting the ranked list of the at least two treatment schedules.

According to a preferred embodiment of the present invention, at least two treatment schedules are determined, further comprising the steps:

(S90) ranking the at least two treatment schedules, based on one or more of the following statistics (Q1) to (Q28):

(Q1) Minimized number of treatments required, (Q2) Minimized number of products applied (Q3) Minimized number of crop protection products and/or of active ingredients applied, (Q4) Minimized total dose or total amount of products, (Q5) Minimized total dose or total amount of crop protection products, (Q6) Minimized number of agricultural equipment required, (Q7) Minimized total use time of agricultural equipment required, (Q8) Minimized number of application methods applied, (Q9) Minimized number of days in which treatments are conducted, (Q10) Minimized total time in which treatments are conducted, (Q11) Minimized treatment frequency index, (Q12) Minimized environmental load (e-load) index, (Q13) Minimized impact to beneficial organisms, (Q14) the number of priority organisms targeted with an efficacy above a defined threshold, wherein in an example, the defined threshold is above 80% and wherein in an example this defined threshold represents the most weighted statistic per treatment schedule;

(Q15) the number of priority organisms targeted with an efficacy above a defined first threshold, weighted or combined with the number of non-priority organisms targeted with an efficacy above a defined second threshold, (Q16) the number of all organisms targeted with an efficacy above a defined threshold;

(Q17) maximum efficacy achieved or expected to be achieved across organisms by a given crop protection product;

(Q18) the fraction of crop protection product in the treatment schedule of known preferred usage at the time of application;

(Q19) the expected or achieved efficacy sum of all crop protection products in the treatment schedule for priority organisms;

(Q20) the expected or achieved efficacy sum of all crop protection products in the treatment schedule for all organisms;

(Q21) if applicable, the average expected control of residual efficacy duration in soil; and/or (Q22) an index accounting for repeating the mode of action and/or active ingredient compared to previous applications, (Q23) the duration of the at least one time window for each treatment, (Q24) the postpone-ability of the at least one time window for each treatment, (Q25) the prepone-ability of the at least one time window for each treatment, (Q26) in case the corresponding treatment schedule comprises at least two treatments, the flexibility of leaving out one of the at least two treatments, (Q27) degree of independency of the efficacy of the treatment schedule from previous or subsequent treatments, (Q28) degree of independency of the efficacy of the treatment schedule from environmental and/or weather conditions, (S100) outputting the ranked list of the at least two treatment schedules.

According to a preferred embodiment of the present invention, the present invention relates to a computer-implemented method for generating control data configured to be used or usable in an agricultural equipment for treating a field, comprising the following steps:

(S10) providing crop data, wherein the crop data comprise information about an agricultural crop species grown or sown or planned to be grown or sown in a field;

(S20) providing field data, wherein the field data comprise information about the field;

(S30)—optionally—providing historic treatment data, wherein the historic data comprise information about historic presence of the organism in the field or in the geographic region in which the field is located in the field, about treatment time, treatment-related parameters, organism control rate of treatments occurring or planned in the past, (S40)—optionally—providing environmental data, wherein the environmental data comprise information about weather, soil, crop stress, biodiversity requirements, regulatory data, and other environmental factors, (S50) at least based on the crop data and on the field data, initiating and/or performing data processing in at least one database and/or database system containing (i) data related to crop data, (ii) data related to field data, (iii) optionally data related to historic treatment data, and (iv) optionally data related to environmental data, (S60) determining the organism-specific risk based on the result of the data processing, wherein the organism-specific risk is the time-related occurrence probability of at least one organism present or expected to be present in a specific field, (S70) providing and/or determining the organism-specific threshold, wherein the organism-specific threshold is a reference value of the organism-specific risk and wherein at least one treatment is required in case the organism-specific risk exceeds the organism-specific threshold, (S80) determining, based on the organism-specific risk and the organism-specific threshold and based on the data processing in at least one treatment-related database, at least two treatment schedules capable of targeting the at least one organism, wherein the treatment schedule comprises:

(A) at least one treatment in a field, and (B) at least one time window for each treatment, and (C) at least one agricultural method and/or product used for each treatment, (S90) ranking the at least two treatment schedules, based on one or more of the following statistics (Q1) to (Q28):

(Q1) Minimized number of treatments required, (Q2) Minimized number of products applied (Q3) Minimized number of crop protection products and/or of active ingredients applied,
(Q4) Minimized total dose or total amount of products,
(Q5) Minimized total dose or total amount of crop protection products,
(Q6) Minimized number of agricultural equipment required,
(Q7) Minimized total use time of agricultural equipment required,
(Q8) Minimized number of application methods applied,
(Q9) Minimized number of days in which treatments are conducted,
(Q10) Minimized total time in which treatments are conducted,
(Q11) Minimized treatment frequency index,
(Q12) Minimized environmental load (e-load) index,
(Q13) Minimized impact to beneficial organisms,
(Q14) the number of priority organisms targeted with an efficacy above a defined threshold, wherein in an example, the defined threshold is above 80% and wherein in an example this defined threshold represents the most weighted statistic per treatment schedule;
(Q15) the number of priority organisms targeted with an efficacy above a defined first threshold, weighted or combined with the number of non-priority organisms targeted with an efficacy above a defined second threshold,
(Q16) the number of all organisms targeted with an efficacy above a defined threshold;
(Q17) maximum efficacy achieved or expected to be achieved across organisms by a given crop protection product;
(Q18) the fraction of crop protection product in the treatment schedule of known preferred usage at the time of application;
(Q19) the expected or achieved efficacy sum of all crop protection products in the treatment schedule for priority organisms;
(Q20) the expected or achieved efficacy sum of all crop protection products in the treatment schedule for all organisms;
(Q21) if applicable, the average expected control of residual efficacy duration in soil;
(Q22) an index accounting for repeating the mode of action and/or active ingredient compared to previous applications,
(Q23) the duration of the at least one time window for each treatment,
(Q24) the postpone-ability of the at least one time window for each treatment,
(Q25) the prepone-ability of the at least one time window for each treatment,
(Q26) in case the corresponding treatment schedule comprises at least two treatments, the flexibility of leaving out one of the at least two treatments,
(Q27) degree of independency of the efficacy of the treatment schedule from previous or subsequent treatments,
(Q28) degree of independency of the efficacy of the treatment schedule from environmental and/or weather conditions,
(S100) outputting the ranked list of the at least two treatment schedules,
(S110) generating control data configured to be used or usable in an agricultural equipment, wherein the control data is based on the highest ranked treatment schedule from the ranked list, or a treatment schedule selected by a user from the ranked list.

According to a preferred embodiment of the present invention, the method further comprises the step of calculating statistics for each treatment schedule.

According to a preferred embodiment of the present invention, the ranking (step S90) is based on at least two of the statistics (Q1) to (Q28), wherein preferably different weighting factors can be defined for the different statistics used for ranking, and wherein the weighting factors may preferably be predefined by the user (via a user interface) or be defined by a data processing step (via a data interface) based on specific data such as user-related data (including data regarding the treatment schedules selected by other users in the neighbouring locations or in the same geographical region in which the field is located), and/or historic treatment data, and/or environmental data.

According to a preferred embodiment of the present invention, the ranking (step S90) is based on one or more of the statistics (Q23) to (Q28).

According to a preferred embodiment of the present invention, the ranking (step S90) is based on one or more of the statistics (Q1) to (Q13) and/or based on one or more of the statistics (Q14) to (Q22) and based on one or more of the statistics (Q23) to (Q28), wherein preferably different weighting factors can be defined for the different statistics used for ranking, and wherein the weighting factors may preferably be predefined by the user (via a user interface) or be defined by a data processing step (via a data interface) based on specific data such as user-related data (including data regarding the treatment schedules selected by other users in the neighbouring locations or in the same geographical region in which the field is located), and/or historic treatment data, and/or environmental data.

According to a preferred embodiment of the present invention, the ranking (step S90) is based on at least three, more preferably at least four, most preferably at least five of the statistics (Q1) to (Q28), wherein preferably different weighting factors can be defined for the different statistics used for ranking, and wherein the weighting factors may preferably be predefined by the user (via a user interface) or be defined by a data processing step (via a data interface) based on specific data such as user-related data (including data regarding the treatment schedules selected by other users in the neighbouring locations or in the same geographical region in which the field is located), and/or historic treatment data, and/or environmental data.

According to a preferred embodiment of the present invention, the ranking (step S90) is based on one or more of the statistics (Q1) to (Q13) and based on one or more of the statistics (Q14) to (Q22), wherein preferably different weighting factors can be defined for the different statistics used for ranking, and wherein the weighting factors may preferably be predefined by the user (via a user interface) or be defined by a data processing step (via a data interface) based on specific data such as user-related data (including data regarding the treatment schedules selected by other users in the neighbouring locations or in the same geographical region in which the field is located), and/or historic treatment data, and/or environmental data.

According to a preferred embodiment of the present invention, the ranking (step S90) is based on one or more of the statistics (Q1) to (Q13) and based on one or more of the statistics (Q14) to (Q22) and based on one or more of the statistics (Q23) to (Q28), wherein preferably different weighting factors can be defined for the different statistics used for ranking, and wherein the weighting factors may preferably be predefined by the user (via a user interface) or be defined by a data processing step (via a data interface) based on specific data such as user-related data (including data regarding the treatment schedules selected by other users in the neighbouring locations or in the same geographical region in which the field is located), and/or historic treatment data, and/or environmental data.

According to a preferred embodiment of the present invention, the ranking (step S90) is based on (Q1).

According to another preferred embodiment, the ranking (step S90) is based on (Q2).

According to another preferred embodiment, the ranking (step S90) is based on (Q4).

According to another preferred embodiment, the ranking (step S90) is based on (Q5).

According to another preferred embodiment, the ranking (step S90) is based on (Q6).

According to another preferred embodiment, the ranking (step S90) is based on (Q7).

According to another preferred embodiment, the ranking (step S90) is based on (Q8).

According to another preferred embodiment, the ranking (step S90) is based on (Q9).

According to another preferred embodiment, the ranking (step S90) is based on (Q10).

According to another preferred embodiment, the ranking (step S90) is based on (Q11).

According to another preferred embodiment, the ranking (step S90) is based on (Q12).

According to another preferred embodiment, the ranking (step S90) is based on (Q13).

According to another preferred embodiment, the ranking (step S90) is based on (Q14).

According to another preferred embodiment, the ranking (step S90) is based on (Q15).

According to another preferred embodiment, the ranking (step S90) is based on (Q16).

According to another preferred embodiment, the ranking (step S90) is based on (Q17).

According to another preferred embodiment, the ranking (step S90) is based on (Q18).

According to another preferred embodiment, the ranking (step S90) is based on (Q19).

According to another preferred embodiment, the ranking (step S90) is based on (Q20).

According to another preferred embodiment, the ranking (step S90) is based on (Q21).

According to another preferred embodiment, the ranking (step S90) is based on (Q22).

According to another preferred embodiment, the ranking (step S90) is based on (Q23).

According to another preferred embodiment, the ranking (step S90) is based on (Q24).

According to another preferred embodiment, the ranking (step S90) is based on (Q25).

According to another preferred embodiment, the ranking (step S90) is based on (Q26).

According to another preferred embodiment, the ranking (step S90) is based on (Q27).

According to another preferred embodiment, the ranking (step S90) is based on (Q28).

According to another preferred embodiment, the ranking (step S90) is based on (Q3) and (Q11).

According to another preferred embodiment, the ranking (step S90) is based on (Q3) and (Q19).

According to another preferred embodiment, the ranking (step S90) is based on (Q11) and (Q19). According to another preferred embodiment, the ranking (step S90) is based on (Q3) and (Q22). According to another preferred embodiment, the ranking (step S90) is based on (Q11) and (Q22). According to a preferred embodiment of the present invention, the ranking (step S90) is based on at least two of the statistics (Q1) to (Q13) and based on at least two of the statistics (Q14) to (Q22), wherein preferably different weighting factors can be defined for the different statistics used for ranking, and wherein the weighting factors may preferably be predefined by the user (via a user interface) or be defined by a data processing step (via a data interface) based on specific data such as user-related data (including data regarding treatment schedules selected by other users in the neighbouring locations or in the same geographical region in which the field is located), and/or historic treatment data, and/or environmental data.

According to a preferred embodiment of the present invention, the ranking (step S90) is based on at least three of the statistics (Q1) to (Q13) and based on at least three of the statistics (Q14) to (Q22), wherein preferably different weighting factors can be defined for the different statistics used for ranking, and wherein the weighting factors may preferably be predefined by the user (via a user interface) or be defined by a data processing step (via a data interface) based on specific data such as user-related data (including data regarding treatment schedules selected by other users in the neighbouring locations or in the same geographical region in which the field is located), and/or historic treatment data, and/or environmental data.

According to a preferred embodiment of the present invention, at least one treatment schedule comprises at least two treatments.

According to a preferred embodiment of the present invention, at least one treatment schedule comprises at least two treatments wherein the time window for the at least two treatments are not identical. As an example, the treatment schedule (TS1) comprises a first treatment using product no. 1 on day 1 (e.g. Apr. 1, 2020) and a second treatment using product no. 1 on day 2 (e.g. Apr. 10, 2020).

According to a preferred embodiment of the present invention, at least one treatment schedule comprises at least two treatments wherein the agricultural method and/or product used for the at least two treatments are not identical. As an example, the treatment schedule (TS2) comprises a first treatment using product no. 1 on day 1 (e.g. Apr. 1, 2020) and a second treatment using product no. 2 also on day 1 (e.g. Apr. 1, 2020).

According to a preferred embodiment of the present invention, at least one treatment schedule comprises at least two treatments wherein the agricultural method and/or product used for the at least two treatments are not identical and wherein the time window for the at least two treatments are not identical. As an example, the treatment schedule (TS3) comprises a first treatment using product no. 1 on day 1 (e.g. Apr. 1, 2020) and a second treatment using product no. 2 on day 2 (e.g. Apr. 10, 2020).

According to a preferred embodiment of the present invention, the treatment schedule comprises:
 (A) at least one treatment in a field, and
 (B) at least one time window for each treatment, and
 (C) at least one agricultural method used for each treatment.

According to a preferred embodiment of the present invention, the treatment schedule comprises:
 (A) at least one treatment in a field, and
 (B) at least one time window for each treatment, and (C) at least one agricultural method used for each treatment,
wherein the agricultural method is at least one selected from the group consisting of mechanical methods, physical methods, chemical methods, and biological methods.

According to a preferred embodiment of the present invention, the treatment schedule comprises:
(A) at least one treatment in a field, and
(B) at least one time window for each treatment, and
(C) at least one agricultural method used for each treatment, wherein the agricultural method is at least one selected from the group consisting of
  a) mechanical methods such as mechanical weed removal or fungi control by machinery such as robots, which for example cuts out the weed or the fungi-infested plant parts, or such as general tillage measures such as ploughing, intertillage, ridging etc.,
  b) physical methods such as weed removal or fungi control by optical light (for example laser light),
  c) chemical methods such as weed removal by spraying a herbicide, or fungi control by spraying a fungicide, or insect control by spraying an insecticide, or nematode control by spraying a nematicide, or attracting beneficial insects to another area outside the agricultural field using chemical attractants, and
  d) biological methods such as weed removal by applying a microorganism used as bioherbicide for weed removal, or a microorganism used as biofungicide for fungi control, or a microorganism used as bio-insecticide for insect control, or a microorganism used as bionematicide for nematode control, or attracting beneficial insects to another area outside the agricultural field by placing other organisms (which serves as food for the beneficial insects) into this another area].

According to a preferred embodiment of the present invention, the treatment schedule comprises:
(A) at least one treatment in a field, and
(B) at least one time window for each treatment, and
(C) at least one agricultural method used for each treatment, wherein the agricultural method is at least one selected from the group consisting of
  a) a or any mechanical, physical, chemical and/or biological method for weed removal or weed control
  b) a or any mechanical, physical, chemical and/or biological method for fungi control,
  c) a or any mechanical, physical, chemical and/or biological method for virus or bacteria control,
  d) a or any mechanical, physical, chemical and/or biological method for insect control, and
  e) a or any mechanical, physical, chemical and/or biological method for control of further pests, such as arachnids, nematodes, mollusks, birds, and rodents.

According to a preferred embodiment of the present invention, the treatment schedule comprises:
(A) at least one treatment in a field, and
(B) at least one time window for each treatment, and
(C) at least one agricultural method used for each treatment,
wherein the agricultural method is at least one selected from the group consisting of
  a) a or any chemical and/or biological method for weed removal or weed control
  b) a or any chemical and/or biological method for fungi control,
  c) a or any chemical and/or biological method for virus or bacteria control,
  d) a or any chemical and/or biological method for insect control, and
  e) a or any chemical and/or biological method for control of further pests, such as arachnids, nematodes, mollusks, birds, and rodents.

According to a preferred embodiment of the present invention, the treatment schedule comprises:
(A) at least one treatment in a field, and
(B) at least one time window for each treatment, and
(C) at least one agricultural method used for each treatment,
wherein the agricultural method is at least one selected from the group consisting of
  a) a or any chemical method for weed removal or weed control,
  b) a or any chemical method for fungi control,
  c) a or any chemical method for virus or bacteria control,
  d) a or any chemical method for insect control, and
  e) a or any chemical method for control of further pests, such as arachnids, nematodes, mollusks, birds, and rodents.

According to a preferred embodiment of the present invention, the treatment schedule comprises:
(A) at least one treatment in a field, and
(B) at least one time window for each treatment, and
(C) at least one product used for each treatment.

According to a preferred embodiment of the present invention, the treatment schedule comprises:
(A) at least one treatment in a field, and
(B) at least one time window for each treatment, and
(C) at least one product used for each treatment, wherein the product is at least one selected from the group consisting of:
  a) a or any product used for weed removal or weed control,
  b) a or any product used for fungi control,
  c) a or any product used for virus or bacteria control,
  d) a or any product used for insect control, and
  e) a or any product used for control of further pests, such as arachnids, nematodes, mollusks, birds, and rodents.

According to a preferred embodiment of the present invention, the treatment schedule comprises
(A) at least one treatment in a field, and
(B) at least one time window for each treatment, and
(C) at least one crop protection product used for each treatment, and,
(D) at least one dosage or amount range of the at least one crop protection product used for each treatment.

According to a preferred embodiment of the present invention, the organism-specific risks for at least two organisms are determined.

According to a preferred embodiment of the present invention, the organism-specific risks for at least two organisms are determined and the organism-specific thresholds for these at least two organisms are provided or determined.

According to a preferred embodiment of the present invention, the organism-specific risks for at least three organisms are determined.

According to a preferred embodiment of the present invention, the organism-specific risks for at least three organisms are determined and the organism-specific thresholds for these at least three organisms are provided or determined.

According to a preferred embodiment of the present invention, the organism-specific risks for at least four organisms are determined.

According to a preferred embodiment of the present invention, the organism-specific risks for at least four organisms are determined and the organism-specific thresholds for these at least four organisms are provided or determined.

According to a preferred embodiment of the present invention, the organism-specific risks for at least five organisms are determined.

According to a preferred embodiment of the present invention, the organism-specific risks for at least five organisms are determined and the organism-specific thresholds for these at least five organisms are provided or determined.

According to a preferred embodiment of the present invention, the organism-specific risks for at least six organisms are determined.

According to a preferred embodiment of the present invention, the organism-specific risks for at least six organisms are determined and the organism-specific thresholds for these at least six organisms are provided or determined.

According to a preferred embodiment of the present invention, the organism-specific risks for at least ten organisms are determined.

According to a preferred embodiment of the present invention, the organism-specific risks for at least six organisms are determined and the organism-specific thresholds for these at least ten organisms are provided or determined.

According to a preferred embodiment of the present invention, the organism-specific risks for at least 20 organisms are determined.

According to a preferred embodiment of the present invention, the organism-specific risks for at least 20 organisms are determined and the organism-specific thresholds for these at least 20 organisms are provided or determined.

According to a preferred embodiment of the present invention, the organism-specific risks for at least 30 organisms are determined.

According to a preferred embodiment of the present invention, the organism-specific risks for at least 30 organisms are determined and the organism-specific thresholds for these at least 30 organisms are provided or determined.

According to a preferred embodiment of the present invention, the organism-specific risks for at least 40 organisms are determined.

According to a preferred embodiment of the present invention, the organism-specific risks for at least 40 organisms are determined and the organism-specific thresholds for these at least 40 organisms are provided or determined.

According to a preferred embodiment of the present invention, the organism-specific risks for at least 50 organisms are determined.

According to a preferred embodiment of the present invention, the organism-specific risks for at least 50 organisms are determined and the organism-specific thresholds for these at least 50 organisms are provided or determined.

According to a preferred embodiment of the present invention, the organism-specific risks for at least 100 organisms are determined.

According to a preferred embodiment of the present invention, the organism-specific risks for at least 100 organisms are determined and the organism-specific thresholds for these at least 100 organisms are provided or determined.

For instance, the maximum weed size (MWS) is an indicator for "organism-specific risk" in case the organism is a weed. MWS is preferably classified into four weed growth categories: pre-weed emergence, juvenile/cotelydon stage/first true leaves, latent, adult/flowering.

The number and/or species of organisms for which the organism-specific risks are determined can be predefined (for example via a user interface), or determined (for example via a data interface) based on specific data such as crop data, and/or field data, and/or historic treatment data—particularly the historic presence of the organism in the field or in the geographic region in which the field is located, and/or environmental data—particularly the forecasted presence of the organism in the field or in the geographic region in which the field is located.

Generally, environmental data comprise information about weather, soil, crop stress, biodiversity requirements, regulatory data, and other environmental factors. According to a preferred embodiment of the present invention, the environmental data also comprises the forecasted presence of the organism in the field or in the geographic region in which the field is located.

According to a preferred embodiment of the present invention, the data processing in step (S50) is carried out in a way to determine or output at least one organism-specific risk with the objective of finding the organism-specific risks for those organisms which have a high relevance in the field or in the geographic region in which the field is located.

According to a preferred embodiment of the present invention, the data processing in step (S80) is carried out in a way to determine or output the treatment schedule which can target the organism with an efficacy level above the efficacy threshold.

According to a preferred embodiment of the present invention, the organism-specific thresholds can be predefined or determined (e.g. computed) by a threshold logic. Preferably, the threshold logic also considers interaction between at least two organisms present or expected to be present in the field. Preferably, the threshold logic also considers the criticality of the organism, which might depend on the interaction between environmental factors and the organism.

According to a preferred embodiment of the present invention, the determination of the organism-specific risk (step S60) is updated—preferably within a crop growing season—within a time interval of not more than five days, preferably not more than four days, more preferably not more than three days, most preferably not more than two days, particularly not more than one day (i.e. a time interval of each day) based on a change of the historic treatment data and/or environmental data which were not considered at the time of the previous determination of the organism-specific risk.

According to a preferred embodiment of the present invention, the determination of at least one treatment schedule (step S80) is updated—preferably within a crop growing season—in a time interval of not more than five days, preferably not more than four days, more preferably not more than three days, most preferably not more than two days, particularly not more than one day (i.e. a time interval of each day) based on a change of the historic treatment data and/or environmental data which were not considered at the time of the previous determination of the treatment schedule, wherein the determination of at least one treatment schedule is updated in terms of the agricultural method or product used for at least one treatment and/or in terms of the time window for at least one treatment.

According to a preferred embodiment of the present invention, at least one organism is a beneficial organism selected from the group consisting of beneficial plants, beneficial fungi, beneficial viruses, beneficial bacteria, beneficial insects, beneficial arachnids, beneficial nematodes, beneficial mollusks, beneficial birds, beneficial rodents, and beneficial protozoa According to a preferred embodiment of the present invention, at least one organism is a harmful organism selected from the group consisting of weeds, fungi, viruses, bacteria, insects, arachnids, nematodes, mollusks, birds, and rodents, more preferably, at least one organism is a harmful organism selected from the group consisting of weeds, fungi, insects, most preferably, at least one organism is weed. In another preferred embodiment of the present invention, at least one organism is fungi.

According to a preferred embodiment of the present invention, the method further comprises the step of providing an application map by combining field data and a treatment schedule. The field data may comprise information about the geographical details, e.g. boundaries, and specifics of the field, the arrangement and the crop growth stage, and/or the distribution/position of the organisms. The field data may also comprise information about topographic characteristics such as slope, elevation, and relief. By providing such field data and combining it with a treatment schedule, a spatially resolved application map can be provided comprising information about where and which dosage should be spread in the field. Notably, the field data can be provided by a user interface or by means of an image recognition or by means of remote or proximal sensing of the respective field. Also here, the respective images can be provided by a satellite or a drone system. In addition, the field data can be provided by a third party, e.g. a service provider analyzing the respective images.

According to a preferred embodiment of the present invention, the method further comprises the step of generating control data configured to be used or usable in an agricultural equipment, wherein the control data is based on the highest ranked treatment schedule from the ranked list, or a treatment schedule selected by a user from the ranked list.

According to a further aspect of the invention, in the invention also relates to a data processing system comprising means for carrying out the computer-implemented method of the present invention.

According to a further aspect of the invention, in the invention also relates to a computer program product comprising instructions which, when the program is executed by a computer, cause the computer to carry out the computer-implemented method of the present invention.

According to a further aspect of the invention, in the invention also relates to computer-readable storage medium comprising instructions which, when executed by a computer, cause the computer to carry out the computer-implemented method of the present invention.

According to a further aspect of the invention, in the invention also relates to the use of a treatment schedule determined by the computer-implemented method of the present invention for providing control data for controlling an agricultural equipment.

In an example, all above-mentioned statistics (Q1) to (Q28) are used for the step of ranking the treatment schedules; preferably at least two of the above-mentioned statistics are used for the step of ranking the treatment schedules; preferably at least three of the above-mentioned statistics are used for the step of ranking the treatment schedules; preferably at least four of the above-mentioned statistics are used for the step of ranking the treatment schedules; preferably at least five of the above-mentioned statistics are used for the step of ranking the treatment schedules; preferably at least six of the above-mentioned statistics are used for the step of ranking the treatment schedules; preferably at least seven of the above-mentioned statistics are used for the step of ranking the treatment schedules and/or preferably at least eight of the above-mentioned statistics are used for the step of ranking the treatment schedules.

In an example, the present invention provides a solution by which a ranking of treatment schedules based on minimum required information can be provided, in particular without the need to be informed about all the details of each product, e.g. the active ingredients of each product, their indicators and their allowed application times.

In a preferred embodiment of the present invention, the treatment-related database is a pesticide product database comprising information about the active ingredient(s) of each pesticide product and a suitable application time for each pesticide product and the application area of each pesticide product, e.g. whether a pesticide product is used against a weed or pathogen and/or against which weeds or pathogens a pesticide product is usually used. Such a pesticide product database may cover all or most of the common pesticide products or may be limited to the pesticide products of a certain provider. Moreover, it is also possible to limit the pesticide product database to pesticide products allowed in a respective jurisdiction. The pesticide product database might be provided by a third party. However, it is also possible that a user creates his tailored pesticide product database by scanning the labels of each pesticide product he intends to use and by acquiring the respective information about each pesticide product from supplier databases. By means of the latter, it is also possible that a user supplements a pesticide product database adding information about further pesticide products.

Notably, the term pesticide according to the present invention is to be understood broadly and may be any herbicide, fungicide, insecticide or mixtures thereof which may be used against a weed and/or pathogen and the like. Moreover, the term pathogen is understood as any living organism, which can cause harm to the plant or can negatively impact the growth or the health of a plant. Pathogens include, but are not limited to, fungi, bacteria, viruses, insect pests, arachnids, nematodes, mollusks, and rodents. In one preferred embodiment, the pathogen is a fungus. In another preferred embodiment, the pathogen is an insect pest.

It is preferred that the crop data is provided by means of a user interface or by a data processing unit. For example, a respective user interface can be provided by a data processing system, e.g. a computer, a smartphone, a tablet or the like, comprising respective inputting means with which a user can provide the respective information. However, it is also possible that the crop data is provided by a data processing unit, e.g. a data processing unit of a sowing machine used to sow the agricultural crop in the field or any other data processing unit in which the crop data is stored.

It is preferred that the historic treatment data is provided by means of a user interface or by a data processing unit. For example, a respective user interface can be provided by a data processing system, e.g. a computer, a smartphone, a tablet or the like, comprising respective inputting means with which a user can provide the respective information. However, it is also possible that the historic treatment data is provided by a data processing unit, e.g. a data processing unit of an agricultural machine used to traverse across the field or any other data processing unit in which the historic treatment data is stored.

It is preferred that the environmental data is provided by means of a user interface or by a data processing unit. For example, a respective user interface can be provided by a data processing system, e.g. a computer, a smartphone, a tablet or the like, comprising respective inputting means with which a user can provide the respective information. However, it is also possible that the environmental data is provided by a data processing unit, e.g. a data processing unit of an agricultural machine used to traverse across the field or any other data processing unit in which the environmental data is stored.

Preferably, the pesticide product information contained in a pesticide product database further comprises information about the efficacy of the pesticide products against an organism and the step of ranking the generated treatment schedules is further based on the efficacy of the pesticide products against an organism. Thereby, not only the number of pesticide products which are needed to target all organisms can be used for ranking the generated treatment schedules, but also the efficacy of the pesticide products. The efficacies can be taken from commercial or public available databases and/or expert revisions, wherein if an expert revised efficacy is at hand, such data is preferred. Moreover, the efficacies can be weighted depending on the respective application, e.g. burn down, second burn down, around planting, emergence, harvesting. In this respect, efficacies may be either averaged across single efficacies and further weighted by the number of pesticide products in treatment schedule. By means of such a ranking the highest efficacy for targeting each organism can be found potentially with a minimum number of pesticide products. In more detail, the ranking may be based on the statistics (Q1) to (Q28).

These statistics may be used to calculate ranking values, which may be attributed to each treatment schedule.

Notably, the above-mentioned statistics relate to preferred parameters/statistics which are considered/used for ranking the at least two treatment schedules. However, further parameters/statistics/information may be considered/used for ranking the treatment schedules.

It is further preferred that the pesticide product information contained in the pesticide product database further comprises information about detrimental effects when mixing specific pesticide products and that the step of ranking the generated treatment schedules is further based on the detrimental effects when mixing specific pesticide products. Thereby, not meaningful pesticide product combinations or pesticide product combinations having antagonistic effects can either be removed or listed at the end of the generated treatment schedules depending on the respective antagonistic effect.

It is preferred that the provided crop data further comprises information about the actually observed or modelled crop growth stage and the sowing date and that the pesticide product information further comprises information about the efficacy of the pesticide products in view of crop growth stage and the sowing date; and that the step of ranking the treatment schedules is further based on the efficacy of the pesticide products in view of crop growth stage or the sowing time. In particular, the efficacies of each pesticide product can be provided for the different crop growth stages, e.g. seed, initial, juvenile, mature/flowering, such that a respective efficacy can be taken into account in view of the actual crop growth stage.

Preferably, the provided crop data further comprises information about the past agricultural crop grown in the field and/or the next agricultural crop planned to be grown in the field; and that the step of ranking the generated treatment schedules is further based on information about the past agricultural crop grown in the field and/or the next agricultural crop planned to be grown in the field. Thereby, the agricultural crop rotation can be considered when ranking the generated treatment schedules and a repeated application of the same pesticide product(s) or the same mode of action can be avoided. Therefore, combinations including a repeated application of pesticide products with the same mode of action and/or a repeated application of the same active ingredient can be a ranked lower, wherein a repeated application of the same active ingredient is ranked lower for avoiding resistances than a repeated mode of action.

It is further preferred that for the application time(s) weather data is obtained and the pesticide product information further comprises information about the weather requirements for applying a pesticide product and/or the efficacy of the pesticide product in view of the weather conditions and wherein the step of ranking the generated treatment schedules is further based on the weather requirements for applying a pesticide product and/or the efficacy of the pesticide product in view of the weather data. Notably, the weather data can be provided by a third party, e.g. a service provider, or by on-side sensors.

It is preferred that the data processing in the treatment-related database search and/or the treatment schedules can be limited to preselected pesticide products. For example, a user may preselect pesticide products already available/stored such that these pesticide products can be used primarily.

Preferably, a treatment schedule comprises mixture instructions, including dosage of the pesticide products and information about useful or required additives to the mixture. For example, minimum, maximum and the recommended dose rate (L/ha) for a herbicide and additive, so herbicides and additives have both a dosing logic, can be provided. Moreover, also the detailed tank mix as recipe for a specific field can be provided (e.g. herbicide1×L, herbicide2×L, additive1 z L, water 3000 L). Thereby, a mixture of the pesticide products mentioned in a treatment schedule can be simplified and failures when mixing the pesticide products can be avoided, e.g. wrong mixing orders, too short stirring times and so on.

Finally, it is preferred that the method further comprises the step of generating control data configured to be used or usable in an agricultural equipment, wherein the control data is based on the highest ranked treatment schedule from the ranked list, or a treatment schedule selected by a user from the ranked list. For example, a user may select a treatment schedule depending on his own considerations or priorities by selecting a respective treatment schedule by respective inputting means of a data processing unit, e.g. a computer, a tablet, a smartphone or the like.

The present invention also relates to the use of a treatment schedule received according to a method for determining and providing a treatment schedule for pesticides as described above for providing control data for controlling an agricultural equipment. In this respect, the term agricultural equipment is to be understood broadly and refers to all machines, data processing units, vehicles, vessels, aircrafts or unmanned aerial vehicle, e.g. also mixing machines/systems for preparing a pesticide mixture, transportation and spraying machines for transporting and spraying the pesticide mixture to or in the field.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

According to a further aspect of the invention, the environmental data comprises information on weather relating to the field or the sub-field zone (referred to as "weather data") and/or information on soil relating to the field or the sub-field zone (referred to as "soil data").

According to a further aspect of the invention, the weather data relating to the field or the sub-field zone include: temperature, air temperature, soil temperature, soil surface temperature, canopy temperature, humidity, air humidity, relative humidity, precipitation, moisture, wind condition, wind speed, and/or sunlight level data relating to the field or the sub-field zone. In a preferred embodiment, the weather data include weather data forecasted for the upcoming days and weeks. In a preferred embodiment, the weather data include weather data at least for the 4 days, more preferably at least for the 1 week, most preferably at least for the 2 weeks, particularly preferably at least for the 3 weeks before planting the crop to be planted in the field or in the sub-field zone. In a preferred embodiment, the weather data include weather data forecasted at least for the upcoming 4 days, more preferably at least for the upcoming 1 week, most preferably at least for the upcoming 2 weeks, particularly preferably at least for the upcoming 3 weeks after planting the crop to be planted in the field or in the sub-field zone. In a preferred embodiment, the weather data include weather data for the days or weeks before planting the crop to be planted in the field or in the sub-field zone and weather data forecasted for the days or weeks after planting the crop to be planted in the field or in the sub-field zone. In a preferred embodiment, the weather data include air temperature, relative humidity, and/or precipitation.

In a preferred embodiment of the invention, the weather data relating to the field or the sub-field zone are received by the computing unit from real-time measurements, preferably using remote or proximal weather sensors.

In a preferred embodiment of the invention, the weather data relating to the field or the sub-field zone are generated by a prediction model for weather data.

According to a further aspect of the invention, the soil data relating to the field or the sub-field zone are received by the computing unit from real-time measurements, preferably using remote or proximal soil sensors.

According to a further aspect of the invention, the soil data relating to the field or the sub-field zone are data indicative of the biological, biochemical, chemical, and/or physical properties of the soil in the field or the sub-field zone.

According to a further aspect of the invention, the soil data relating to the field or the sub-field zone include:
 a) soil organic matter, total carbon content, organic carbon content, inorganic carbon content, boron content, phosphorus content, potassium content, nitrogen content, sulfur content, calcium content, iron content, aluminum content, chlorine content, molybdenum content, magnesium content, nickel content, copper content, zinc content, Manganese content, and/or pH value of the soil in the field or the sub-field zone; and/or
 b) soil quality, soil sandiness, soil moisture, soil humidity, soil temperature, soil surface temperature, soil density, soil texture, soil conductivity, and/or water holding capacity of the soil in the field or the sub-field zone.

According to a further aspect of the invention, the soil data relating to the field or the sub-field zone include soil organic matter, total carbon content, organic carbon content, and/or inorganic carbon content of the soil in the field or the sub-field zone. According to a further aspect of the invention, the soil data relating to the field or the sub-field zone include the nitrogen content of the soil in the field or the sub-field zone. According to a further aspect of the invention, the soil data relating to the field or the sub-field zone include soil quality, soil sandiness, soil moisture, soil humidity, soil temperature, soil surface temperature, soil density, soil texture, soil conductivity, and/or water holding capacity of the soil in the field or the sub-field zone the nitrogen content. According to a further aspect of the invention, the soil data relating to the field or the sub-field zone include the soil texture. According to a further aspect of the invention, the soil data relating to the field or the sub-field zone include the soil moisture. According to a further aspect of the invention, the soil data relating to the field or the sub-field zone include the soil texture and the soil moisture.

According to a further aspect of the invention, the soil data relating to the field or the sub-field zone include at least two different types of soil data, for example soil texture and soil moisture, or for example soil texture and soil organic matter.

In a preferred embodiment of the invention, the soil data relating to the field or the sub-field zone are received by the computing unit from real-time measurements, preferably using remote or proximal soil sensors.

In a preferred embodiment of the invention, the soil data relating to the field or the sub-field zone are generated by a prediction model for soil data.

Definitions

In the context of the present invention, the term "include" means "comprise".

In the context of the present invention, the term "determining" also means "initiating determining".

In the context of the present invention, the term "target" (as verb) or "targeting" means "control" or "combat" in case a harmful organism is targeted, and means "protect" or "repel to another field or area" in case a beneficial organism is targeted.

In the context of the present invention, the term "treatment-related parameter" is to be understood broadly and refers to product (active ingredient), dosing, application technology, environmental data (weather data, soil data) used for the treatment.

In the context of the present invention, the term "efficacy" is to be understood broadly and refers to the effectiveness of a product (such as a crop protection product, e.g. an herbicide), against the targeted organism (such as a weed). Preferably, efficacy is dependent from the weather conditions.

In the context of the present invention, the term "field" is understood to be any area in which crop plants, are produced, grown, sown, and/or planned to be produced, grown or sown. The term "field" includes agricultural fields, horticultural fields, and silvicultural fields. Preferably, field is an agricultural field.

In the context of the present invention, the term "control data" or "control file" is understood to be any binary file, data, signal, identifier, code, image, or any other machine-readable or machine-detectable element useful for controlling a machine or a device or an agricultural equipment, for example an agricultural treatment device.

In the context of the present invention, the term "postpone-ability" is understood to be the possibility to postpone, particularly regarding the time window of single treatments as part of a treatment schedule.

In the context of the present invention, the term "prepone-ability" is understood to be the possibility to prepone (move to an earlier date as planned), particularly regarding the time window of single treatments as part of a treatment schedule.

In the context of the present invention, the term "database" is understood to be any organized collection of data, which can be stored electronically and accessed from a computer system, including but not limited to relational database, non-relational database, graph database, network database, cloud database, in-memory database, active database, data warehouse, deductive database, distributed database, embedded data-base, end-user database, hypertext or hypermedia database, knowledge database, mobile database, operational database, parallel database, probabilistic database, real-time database, spatial database, temporal database, terminology-oriented database, and Excel databases. In a preferred embodiment of the present invention, the database is at least one of the following databases: relational database, non-relational data-base, graph database, network database, cloud database, in-memory database, active database, data warehouse, deductive database, distributed database, embedded database, end-user database, hypertext or hypermedia database, knowledge database, mobile database, operational database, parallel database, probabilistic database, real-time database, spatial database, temporal database, terminology-oriented data-base, and Excel databases.

In the context of the present invention, the term "database system" is understood to be a system comprising more than one database which are connected to each other, including but not limited to federated data-base systems, array database management systems, and other database management systems.

In the context of the present invention, the term "data processing" is understood to be any operation on the data to produce or output meaningful information, which is conducted by a computer system. Data processing includes but is not limited to data validation, data analysis, data aggregation, data sorting, data classification, data summarization, data conversion, data modification, data update etc. Data processing in a database or database system also may include the automated request in a database or database system and the automated outputting of the result of such request. Data processing may also include machine-learning processes.

In the context of the present invention, the term "treatment" is understood to be any kind of treatment possible on an agricultural field, including but not limited to fertilization, crop protection, growth regulation, harvesting, adding or removing of organisms—particularly crop plants —, as well as soil treatment, soil nutrient management, soil nitrogen management, tilling, ploughing, irrigation. In a preferred embodiment of the present invention, treatment is one of the following activities: fertilization, crop protection, growth regulation, harvesting, adding or removing of organisms—particularly crop plants—, as well as soil treatment, soil nutrient management, soil nitrogen management, tilling, ploughing, irrigation. In another preferred embodiment of the present invention, treatment is fertilization. In another preferred embodiment of the present invention, treatment is crop protection. In another preferred embodiment of the present invention, treatment is growth regulation. In another preferred embodiment of the present invention, treatment is harvesting. In another preferred embodiment of the present invention, treatment is adding or removing of organisms—particularly crop plants.

In the context of the present invention, the term "product" is understood to be any object or material useful for the treatment. In the context of the present invention, the term "product" includes but is not limited to:

chemical products such as fungicide, herbicide, insecticide, acaricide, molluscicide, nematicide, avicide, piscicide, rodenticide, repellant, attractant, bactericide, biocide, safener, plant growth regulator, urease inhibitor, nitrification inhibitor, denitrification inhibitor, or any combination thereof.

biological products such as microorganisms useful as fungicide (biofungicide), herbicide (bioherbicide), insecticide (bioinsecticide), acaricide (bioacaricide), molluscicide (biomolluscicide), nematicide (bionematicide), avicide, piscicide, rodenticide, repellant, bactericide, biocide, safener, plant growth regulator, urease inhibitor, nitrification inhibitor, denitrification inhibitor, or any combination thereof.

fertilizer and nutrient, water, and any combination thereof.

In the context of the present invention, the term "product" also includes a combination of different products.

In a preferred embodiment of the present invention, the product is a chemical product such as fungicide, herbicide, insecticide, acaricide, molluscicide, nematicide, avicide, piscicide, rodenticide, repellant, or attractant, also includes a combination of different products. In a preferred embodiment of the present invention, the product is a herbicide. In a preferred embodiment of the present invention, the product is a fungicide. In a preferred embodiment of the present invention, the product is an insecticide. In a preferred embodiment of the present invention, the product is an acaricide, molluscicide, nematicide, avicide, piscicide, or rodenticide. In a preferred embodiment of the present invention, the product is a repellant or attractant.

In the context of the present invention, the term "dose rate" or "dosage" is understood as amount of product to be applied per area, for example expressed as liter per hectare (L/ha).

In the context of the present invention, the time window (for a treatment) can preferably range from 10 days to 1 hour, more preferably from 7 days to 3 hours, most preferably from 5 days to 5 hours, particularly preferably from 3 days to 8 hours, particularly more preferably from 2 days to 12 hours, particularly from 36 hours to 16 hours, for example from 28 hours to 20 hours.

In the context of the present invention, the term "application map" is understood to be a map indicating a two-dimensional spatial distribution of the amounts, or dose rates, or types, or forms of products which should be applied on different locations or zones within an agricultural field. In the context of the present invention, the term "zone" is understood to be a sub-field zone or a part of an agricultural field, i.e. an agricultural field can be spatially divided into more than one zone, wherein each zone may have different properties such as different biomass levels or different weed and/or pathogen infestation risks. Particularly, the application map may indicate that in different zones, different amounts, or dose rates, or types, or forms of products should be applied. For example, the application map may indicate that in the first zone, the product should be applied in a product dose rate of 10 liters per hectare, and in the second zone, the same product should be applied in a product dose rate of 20 liters per hectare.

In the context of the present invention, the term "geographic region" is to be understood broadly and may be an administrative region [such as a District ("Kreis") or Federal State ("Bundesland") in Germany], an economic region (such as the European Union), a country (such as Germany), a continent (such as Europe) or a part of a continent (such as Central Europe), a climate zone, or any combination thereof.

In the context of the present invention, an "agricultural method" includes but is not limited to
  a) mechanical methods such as mechanical weed removal or fungi control by machinery such as robots, which for example cuts out the weed or the fungi-infested plant parts, or such as general tillage measures such as ploughing, intertillage, ridging etc.,
  b) physical methods such as weed removal or fungi control by optical light (for example laser light),
  c) chemical methods such as weed removal by spraying a herbicide, or fungi control by spraying a fungicide, or insect control by spraying an insecticide, or nematode control by spraying a nematicide, or attracting beneficial insects to another area outside the agricultural field using chemical attractants, and
  d) biological methods such as weed removal by applying a microorganism used as bioherbicide for weed removal, or a microorganism used as biofungicide for fungi control, or a microorganism used as bioinsecticide for insect control, or a microorganism used as bionematicide for nematode control, or attracting beneficial insects to another area outside the agricultural field by placing other organisms (which serves as food for the beneficial insects) into this another area].

In the context of the present invention, data related to crop data may be
  a) any data which is—e.g. in a database or database system—connected or related to crop data,
  b) any data which can be transformed or translated to crop data,
  c) an identifier for the crop data, or
  d) crop data as such.

In the context of the present invention, data related to field data may be
  a) any data which is—e.g. in a database or database system—connected or related to field data,
  b) any data which can be transformed or translated to field data,
  c) an identifier for the field data, or
  d) field data as such.

In the context of the present invention, data related to historic treatment data may be
  a) any data which is—e.g. in a database or database system—connected or related to historic treatment data,
  b) any data which can be transformed or translated to historic treatment data,
  c) an identifier for the historic treatment data, or
  d) historic treatment data as such.

In the context of the present invention, data related to environmental data may be
  a) any data which is—e.g. in a database or database system—connected or related to environmental data,
  b) any data which can be transformed or translated to environmental data,
  c) an identifier for the environmental data, or
  d) environmental data as such.

The ranking statistics (Q23) to (Q28) are a good indicator for the flexibility and adaptability of a treatment schedule. By using the ranking statistics (Q23) to (Q28) for ranking, the treatment schedules with the highest flexibility will be ranked highest. Taking (Q23) as example, if a treatment schedule comprises three single treatments T1, T2, T3, and the time window of the second single treatment T2 is more or less postpone-able, then this would give the user the flexibility of postponing single treatment T2 to a later data, so that single treatments T2 and T3 can be potentially carried out at the same date, thus potentially saving costs for agricultural equipment for example.

In case of (Q23), the ranking of a treatment schedule improves or the ranking score increases with the longer duration of the time window for each treatment, since the flexibility of conducting the single treatments is higher.

In case of (Q24), the ranking of a treatment schedule improves or the ranking score increases with the better postpone-ability of the time window for each treatment, particularly for the first ones among multiple single treatments, since there is a higher likelihood that for example the first single treatment among two treatments (in total) can be postponed and "merged" with the second single treatment, thus reducing the number of treatments by 1.

In case of (Q25), the ranking of a treatment schedule improves or the ranking score increases with the better prepone-ability of the time window for each treatment, particularly for the last ones among multiple single treatments, since there is a higher likelihood that for example the second single treatment can be preponed and "merged" with the first single treatment, thus reducing the number of treatments by 1.

In case of (Q26), the ranking of a treatment schedule improves or the ranking score increases with the better flexibility, since there is a higher likelihood that one among multiple treatments can be left out.

In case of (Q27), the ranking of a treatment schedule improves or the ranking score increases with the increasing independency of the efficacy of the treatment schedule from previous or subsequent treatments, since in cases of high independency, there is a high likelihood that previous or subsequent treatments can be left out without consequences.

In case of (Q28), the ranking of a treatment schedule improves or the ranking score increases with the increasing independency of the efficacy of the treatment schedule from environmental and/or weather conditions, since in cases of high independency, there is a high likelihood that the treatment schedule can be still carried out in case of harsh weather conditions.

The ranking of the treatment schedule can be done by calculating a ranking score (as numeric value or as a matrix or as a vector).

The following embodiments (Embodiments 1 to 38) are preferred embodiments of the present invention:

Embodiment 1

Computer-implemented method for determining at least one treatment schedule for treating a field, comprising the following steps:
- (S10) providing crop data, wherein the crop data comprise information about an agricultural crop species grown or sown or planned to be grown or sown in a field;
- (S20) providing field data, wherein the field data comprise information about the field;
- (S30)—optionally—providing historic treatment data, wherein the historic data comprise information about historic presence of the organism in the field or in the geographic region in which the field is located in the field, about treatment time, treatment-related parameters, organism control rate of treatments occurring or planned in the past,
- (S40)—optionally—providing environmental data, wherein the environmental data comprise information about weather, soil, crop stress, biodiversity requirements, regulatory data, and other environmental factors,
- (S50) at least based on the crop data and on the field data, initiating and/or performing data processing in at least one database and/or database system containing
  (i) data related to crop data,
  (ii) data related to field data,
  (iii) optionally data related to historic treatment data, and
  (iv) optionally data related to environmental data,
- (S60) determining the organism-specific risk based on the result of the data processing, wherein the organism-specific risk is the time-related occurrence probability of at least one organism present or expected to be present in a specific field,
- (S70) providing and/or determining the organism-specific threshold, wherein the organism-specific threshold is a reference value of the organism-specific risk and wherein at least one treatment is required in case the organism-specific risk exceeds the organism-specific threshold,
- (S80) determining, based on the organism-specific risk and the organism-specific threshold and based on the data processing in at least one treatment-related database, at least one treatment schedule capable of targeting the at least one organism, wherein the treatment schedule comprises:
  (A) at least one treatment in a field, and
  (B) at least one time window for each treatment, and
  (C) at least one agricultural method and/or product used for each treatment.

Embodiment 2

Computer-implemented method according to embodiment 1, wherein at least two treatment schedules are determined, further comprising the steps:
- (S90) ranking the at least two treatment schedules, based on one or more of the following statistics (Q1) to (Q28):
- (Q1) Minimized number of treatments required,
- (Q2) Minimized number of products applied
- (Q3) Minimized number of crop protection products and/or of active ingredients applied,
- (Q4) Minimized total dose or total amount of products,
- (Q5) Minimized total dose or total amount of crop protection products,
- (Q6) Minimized number of agricultural equipment required,
- (Q7) Minimized total use time of agricultural equipment required,
- (Q8) Minimized number of application methods applied,
- (Q9) Minimized number of days in which treatments are conducted,
- (Q10) Minimized total time in which treatments are conducted,
- (Q11) Minimized treatment frequency index,
- (Q12) Minimized environmental load (e-load) index,
- (Q13) Minimized impact to beneficial organisms,
- (Q14) the number of priority organisms targeted with an efficacy above a defined threshold, wherein in an example, the defined threshold is above 80% and wherein in an example this defined threshold represents the most weighted statistic per treatment schedule;
- (Q15) the number of priority organisms targeted with an efficacy above a defined first threshold, weighted or combined with the number of non-priority organisms targeted with an efficacy above a defined second threshold,
- (Q16) the number of all organisms targeted with an efficacy above a defined threshold;
- (Q17) maximum efficacy achieved or expected to be achieved across organisms by a given crop protection product;
- (Q18) the fraction of crop protection product in the treatment schedule of known preferred usage at the time of application;
- (Q19) the expected or achieved efficacy sum of all crop protection products in the treatment schedule for priority organisms;
- (Q20) the expected or achieved efficacy sum of all crop protection products in the treatment schedule for all organisms;
- (Q21) if applicable, the average expected control of residual efficacy duration in soil; and/or
- (Q22) an index accounting for repeating the mode of action and/or active ingredient compared to previous applications,
- (Q23) the duration of the at least one time window for each treatment,
- (Q24) the postpone-ability of the at least one time window for each treatment,
- (Q25) the prepone-ability of the at least one time window for each treatment, (Q26) in case the corresponding treatment schedule comprises at least two treatments, the flexibility of leaving out one of the at least two treatments,
(Q27) degree of independency of the efficacy of the treatment schedule from previous or subsequent treatments,
(Q28) degree of independency of the efficacy of the treatment schedule from environmental and/or weather conditions,
(S100) outputting the ranked list of the at least two treatment schedules.

Embodiment 3

Computer-implemented method according to embodiment 2, wherein the method further comprises the step of calculating statistics for each treatment schedule.

Embodiment 4

Computer-implemented method according to embodiment 2, wherein the ranking (step S90) is based on one or more of the statistics (Q1) to (Q13) and based on one or more of the statistics (Q14) to (Q22).

Embodiment 5

Computer-implemented method according to anyone of the embodiments 1 to 4, wherein at least one treatment schedule comprises at least two treatments.

Embodiment 6

Computer-implemented method according to anyone of the embodiments 1 to 4, wherein at least one treatment schedule comprises at least two treatments wherein the time window for the at least two treatments are not identical.

Embodiment 7

Computer-implemented method according to anyone of the embodiments 1 to 4, wherein at least one treatment schedule comprises at least two treatments wherein the agricultural method and/or product used for the at least two treatments are not identical.

Embodiment 8

Computer-implemented method according to anyone of the embodiments 1 to 4, wherein at least one treatment schedule comprises at least two treatments wherein the agricultural method and/or product used for the at least two treatments are not identical and wherein the time window for the at least two treatments are not identical.

Embodiment 9

Computer-implemented method according to anyone of the embodiments 1 to 8, wherein the treatment schedule comprises
(A) at least one treatment in a field, and
(B) at least one time window for each treatment, and
(C) at least one crop protection product used for each treatment, and,
(D) at least one dosage or amount range of the at least one crop protection product used for each treatment.

Embodiment 10

Computer-implemented method according to anyone of the embodiments 1 to 9, wherein the organism-specific risks for at least two organisms are determined.

Embodiment 11

Computer-implemented method according to anyone of the embodiments 1 to 9, wherein the organism-specific risks for at least two organisms are determined and the organism-specific thresholds for these at least two organisms are provided or determined.

Embodiment 12

Computer-implemented method according to anyone of the embodiments 1 to 9, wherein the organism-specific risks for at least ten organisms are determined.

Embodiment 13

Computer-implemented method according to anyone of the embodiments 1 to 9, wherein the organism-specific risks for at least ten organisms are determined and the organism-specific thresholds for these at least ten organisms are provided or determined Embodiment 14

Computer-implemented method according to anyone of the embodiments 1 to 9, wherein the organism-specific risks for at least 50 organisms are determined.

Embodiment 15

Computer-implemented method according to anyone of the embodiments 1 to 9, wherein the organism-specific risks for at least 50 organisms are determined and the organism-specific thresholds for these at least 50 organisms are provided or determined.

Embodiment 16

Computer-implemented method according to anyone of the embodiments 1 to 15, wherein the determination of the organism-specific risk (step S60) is updated within a time interval of not more than five days based on a change of the historic treatment data and/or environmental data which were not considered at the time of the previous determination of the organism-specific risk.

Embodiment 17

Computer-implemented method according to anyone of the embodiments 1 to 16, wherein the determination of at least one treatment schedule (step S80) is updated in a time interval of not more than five days based on a change of the historic treatment data and/or environmental data which were not considered at the time of the previous determination of the treatment schedule, wherein the determination of at least one treatment schedule is updated in terms of the agricultural method or product used for at least one treatment and/or in terms of the time window for at least one treatment.

Embodiment 18

Computer-implemented method according to anyone of the embodiments 1 to 17, wherein at least one organism is a beneficial organism selected from the group consisting of beneficial plants, beneficial fungi, beneficial viruses, beneficial bacteria, beneficial insects, beneficial arachnids, beneficial nematodes, beneficial mollusks, beneficial birds, beneficial rodents, and beneficial protozoa.

Embodiment 19

Computer-implemented method according to anyone of the embodiments 1 to 17, wherein at least one organism is a harmful organism selected from the group consisting of weeds, fungi, viruses, bacteria, insects, arachnids, nematodes, mollusks, birds, and rodents.

Embodiment 20

Computer-implemented method according to any one of the embodiments 1 to 19, wherein the method further comprises the step of providing an application map by combining field data and a treatment schedule.

Embodiment 21

Computer-implemented method according to anyone of the embodiments 1 to 19, wherein the method further comprises the step of generating control data configured to be used or usable in an agricultural equipment, wherein the control data is based on the highest ranked treatment schedule from the ranked list, or a treatment schedule selected by a user from the ranked list.

Embodiment 22

Use of a treatment schedule determined by the computer-implemented method according to anyone of the embodiments 1 to 21 for providing control data for controlling an agricultural equipment.

Embodiment 23

A data processing system comprising means for carrying out the computer-implemented method according to anyone of the embodiments 1 to 21.

Embodiment 24

A computer program product comprising instructions which, when the program is executed by a computer, cause the computer to carry out the computer-implemented method according to anyone of the embodiments 1 to 21.

Embodiment 25

A computer-readable storage medium comprising instructions which, when executed by a computer, cause the computer to carry out the computer-implemented method according to anyone of the embodiments 1 to 21.

Embodiment 26

Computer-implemented method for determining an organism-specific risk, comprising the following steps:
 (S10) providing crop data, wherein the crop data comprise information about an agricultural crop species grown or sown or planned to be grown or sown in a field;
 (S20) providing field data, wherein the field data comprise information about the field;
 (S30)—optionally—providing historic treatment data, wherein the historic data comprise information about historic presence of the organism in the field or in the geographic region in which the field is located in the field, about treatment time, treatment-related parameters, organism control rate of treatments occurring or planned in the past,
 (S40)—optionally—providing environmental data, wherein the environmental data comprise information about weather, soil, crop stress, biodiversity requirements, regulatory data, and other environmental factors,
 (S50) at least based on the crop data and on the field data, initiating and/or performing data processing in at least one database and/or database system containing
  (i) data related to crop data,
  (ii) data related to field data,
  (iii) optionally data related to historic treatment data, and
  (iv) optionally data related to environmental data,
 (S60) determining the organism-specific risk based on the result of the data processing, wherein the organism-specific risk is the time-related occurrence probability of at least one organism present or expected to be present in a specific field,
 (S70) optionally providing and/or determining the organism-specific threshold, wherein the organism-specific threshold is a reference value of the organism-specific risk and wherein at least one treatment is required in case the organism-specific risk exceeds the organism-specific threshold,
 (S75) optionally determining the time window in which the organism-specific risk will exceed the organism-specific threshold.

Embodiment 27

Computer-implemented method according to embodiment 26, wherein the organism-specific risks for at least two organisms are determined.

Embodiment 28

Computer-implemented method according to embodiments 26 to 27, wherein the organism-specific risks for at least two organisms are determined and the organism-specific thresholds for these at least two organisms are provided or determined.

Embodiment 29

Computer-implemented method according to anyone of the embodiments 26 to 28, wherein the determination of the organism-specific risk (step S60) is updated within a time interval of not more than five days based on a change of the historic treatment data and/or environmental data which were not considered at the time of the previous determination of the organism-specific risk.

Embodiment 30

Computer-implemented method according to anyone of the embodiments 26 to 29, wherein at least one organism is a beneficial organism selected from the group consisting of beneficial plants, beneficial fungi, beneficial viruses, beneficial bacteria, beneficial insects, beneficial arachnids, beneficial nematodes, beneficial mollusks, beneficial birds, beneficial rodents, and beneficial protozoa.

Embodiment 31

Computer-implemented method according to anyone of the embodiments 26 to 30, wherein at least one organism is a harmful organism selected from the group consisting of weeds, fungi, viruses, bacteria, insects, arachnids, nematodes, mollusks, birds, and rodents.

Embodiment 32

Use of an organism-specific risk determined by the computer-implemented method according to anyone of the embodiments 26 to 31 for providing control data for controlling an agricultural equipment.

Embodiment 33

A data processing system comprising means for carrying out the computer-implemented method according to anyone of the embodiments 26 to 31.

Embodiment 34

A computer program product comprising instructions which, when the program is executed by a computer, cause the computer to carry out the computer-implemented method according to anyone of the embodiments 26 to 31.

Embodiment 35

A computer-readable storage medium comprising instructions which, when executed by a computer, cause the computer to carry out the computer-implemented method according to anyone of the embodiments 26 to 31.

Embodiment 36

Computer-implemented method for determining a ranked list of at least two treatment schedules for treating a field, comprising the following steps:
- (S10) providing crop data, wherein crop data comprise information about an agricultural crop species grown or sown or planned to be grown or sown in a field;
- (S20) providing field data, wherein field data comprise information about the field (including its geographic position and topographic characteristics);
- (S30) providing historic treatment data, wherein historic data comprise information about historic presence of the organism in the field or in the geographic region in which the field is located in the field, about treatment time, treatment-related parameters, organism control rate of treatments occurring or planned in the past,
- (S40) providing environmental data, wherein the environmental data comprise information about weather, soil, crop stress, biodiversity requirements, regulatory data, and other environmental factors,
- (S50) at least based on the crop data and on the field data, initiating and/or performing data processing in at least one database and/or database system containing
  - (i) data related to crop data,
  - (ii) data related to field data,
  - (iii) data related to historic treatment data, and
  - (iv) data related to environmental data,
- (S60) determining the organism-specific risks based on the result of the data processing, wherein the organism-specific risk is the time-related occurrence probability of at least one organism present or expected to be present in a specific field,
- (S70) providing and/or determining the organism-specific threshold, wherein the organism-specific threshold is a reference value of the organism-specific risk and wherein at least one treatment is required in case the organism-specific risk exceeds the organism-specific threshold,
- (S80) determining, based on the organism-specific thresholds and the organism-specific risks and based on the data processing in at least one treatment-related database, at least two treatment schedules capable of targeting the at least one organism (preferably with an efficacy above an efficacy threshold),
wherein the treatment schedule comprises:
- (A) at least one treatment in a field, and
- (B) at least one time window for each treatment, and
- (C) at least one agricultural method and/or product used for each treatment.
- (S90) ranking the at least two treatment schedules, based on one or more of the following statistics (Q1) to (Q28):
- (Q1) Minimized number of treatments required,
- (Q2) Minimized number of products applied
- (Q3) Minimized number of crop protection products and/or of active ingredients applied,
- (Q4) Minimized total dose or total amount of products,
- (Q5) Minimized total dose or total amount of crop protection products,
- (Q6) Minimized number of agricultural equipment required,
- (Q7) Minimized total use time of agricultural equipment required,
- (Q8) Minimized number of application methods applied,
- (Q9) Minimized number of days in which treatments are conducted,
- (Q10) Minimized total time in which treatments are conducted,
- (Q11) Minimized treatment frequency index,
- (Q12) Minimized environmental load (e-load) index,
- (Q13) Minimized impact to beneficial organisms,
- (Q14) the number of priority organisms targeted with an efficacy above a defined threshold,
wherein in an example, the defined threshold is above 80% and wherein in an example this defined threshold represents the most weighted statistic per treatment schedule;
- (Q15) the number of priority organisms targeted with an efficacy above a defined first threshold weighted or combined with the number of non-priority organisms targeted with an efficacy above a defined second threshold,
- (Q16) the number of all organisms targeted with an efficacy above a defined threshold;
- (Q17) maximum efficacy achieved or expected to be achieved across organisms by a given crop protection product;
- (Q18) the fraction of crop protection product in the treatment schedule of known preferred usage at the time of application;
- (Q19) the expected or achieved efficacy sum of all crop protection products in the treatment schedule for priority organisms;

(Q20) the expected or achieved efficacy sum of all crop protection products in the treatment schedule for all organisms;
(Q21) if applicable, the average expected control of residual efficacy duration in soil; and/or
(Q22) an index accounting for repeating the mode of action and/or active ingredient compared to previous applications,
(Q23) the duration of the at least one time window for each treatment,
(Q24) the postpone-ability of the at least one time window for each treatment,
(Q25) the prepone-ability of the at least one time window for each treatment,
(Q26) in case the corresponding treatment schedule comprises at least two treatments, the flexibility of leaving out one of the at least two treatments,
(Q27) degree of independency of the efficacy of the treatment schedule from previous or subsequent treatments,
(Q28) degree of independency of the efficacy of the treatment schedule from environmental and/or weather conditions,
(S100) outputting the ranked list of the at least two treatment schedules.

Embodiment 37

Computer-implemented method according to Embodiment 36,
wherein at least one treatment schedule comprises at least two treatments wherein the agricultural method and/or product used for the at least two treatments are not identical and wherein the time window for the at least two treatments are not identical, and/or wherein the treatment schedule comprises
(A) at least one treatment in a field, and
(B) at least one time window for each treatment, and
(C) at least one crop protection product used for each treatment, and,
(D) at least one dosage or amount range of the at least one crop protection product used for each treatment,
and/or wherein the organism-specific risks for at least two organisms are determined.

Embodiment 38

Computer-implemented method according to Embodiment 36 or 37, wherein the method further comprises the step of generating control data configured to be used or usable in an agricultural equipment, wherein the control data is based on the highest ranked treatment schedule from the ranked list.

Example 1

The following exemplary embodiment of the present invention is provided:
Three treatment schedules, (TA), (TB) and (TC), have been determined by the method of the present invention in relation to the two harmful organisms (O1) and (O2), i.e. the organism-specific risks in relation to the two harmful organisms (O1) and (O2) have also been determined by the method of the present invention.
Treatment schedule (TA) comprises the following treatments:
3 single treatments (TA1) and (TA2) and (TA3)
Time window of (TA1) is on Day 1 (e.g. Apr. 1, 2020), and time window of (TA2) is on Day 3 (e.g. Apr. 10, 2020), and time window of (TA3) is on Day 6 (e.g. Apr. 20, 2020)
Product used for (TA1) is (P1), and product used for (TA2) is (P2), and product used for (TA3) is (P3), and total amount of (P1) plus (P2) plus (P3) used for treatment schedule (TA) is for example X liters (wherein X<Y<Z),
Expected efficacy sum of treatment schedule (TA) for controlling the two harmful organisms (O1) and (O2) is x % (wherein x>y>z).
Treatment schedule (TB) comprises the following treatments:
2 single treatments (TB1) and (TB2)
Time window of (TB1) is on Day 2 (e.g. Apr. 5, 2020), and time window of (TB2) is on Day 5 (e.g. Apr. 15, 2020)
Product used for (TB1) is (P4), and product used for (TB2) is (P5), and total amount of (P4) plus (P5) used for treatment schedule (TB) is Y liters (wherein X<Y<Z)
Expected efficacy sum of treatment schedule (TB) for controlling the two harmful organisms (O1) and (O2) is y % (wherein x>y>z).
Treatment schedule (TC) comprises the following treatments:
1 single treatment (TC1)
Time window of (TC1) is on Day 4 (e.g. Apr. 12, 2020)
Product used for (TC1) is (P6), and total amount of (P6) used for treatment schedule (TC) is for example Z liters (wherein X<Y<Z),
Expected efficacy sum of treatment schedule (TC) for controlling the two harmful organisms (O1) and (O2) is z % (wherein x>y>z).
In case x=95%, y=90%, and z=85%, and in case the three treatment schedules are ranked according to (Q1) ("Minimized number of treatments required") and (Q20) ("the expected or achieved efficacy sum of all crop protection products in the treatment schedule for all organisms") with a defined weighting factor of 50% each for (Q1) and (Q2), the three treatment schedules will be ranked as follows:
Highest (no. 1): Treatment schedule (TC)—especially because it only needs one single treatment
Medium (no. 2): Treatment schedule (TB)
Lowest (no. 3): Treatment schedule (TA)
In case x=95%, y=90%, and z=85%, and in case the three treatment schedules are ranked according to (Q4) ("Minimized total dose rate or amount of products") and (Q20) ("the expected or achieved efficacy sum of all crop protection products in the treatment schedule for all organisms") with a defined weighting factor of 50% each for (Q4) and (Q20), the three treatment schedules will be ranked as follows:
Highest (no. 1): Treatment schedule (TA)—especially because the total amount of products used is the lowest
Medium (no. 2): Treatment schedule (TB)
Lowest (no. 3): Treatment schedule (TC)

BRIEF DESCRIPTION OF THE DRAWINGS

In the following, the invention is described exemplarily with reference to the enclosed figure, in which.

DETAILED DESCRIPTION OF EMBODIMENT

Figure 1:
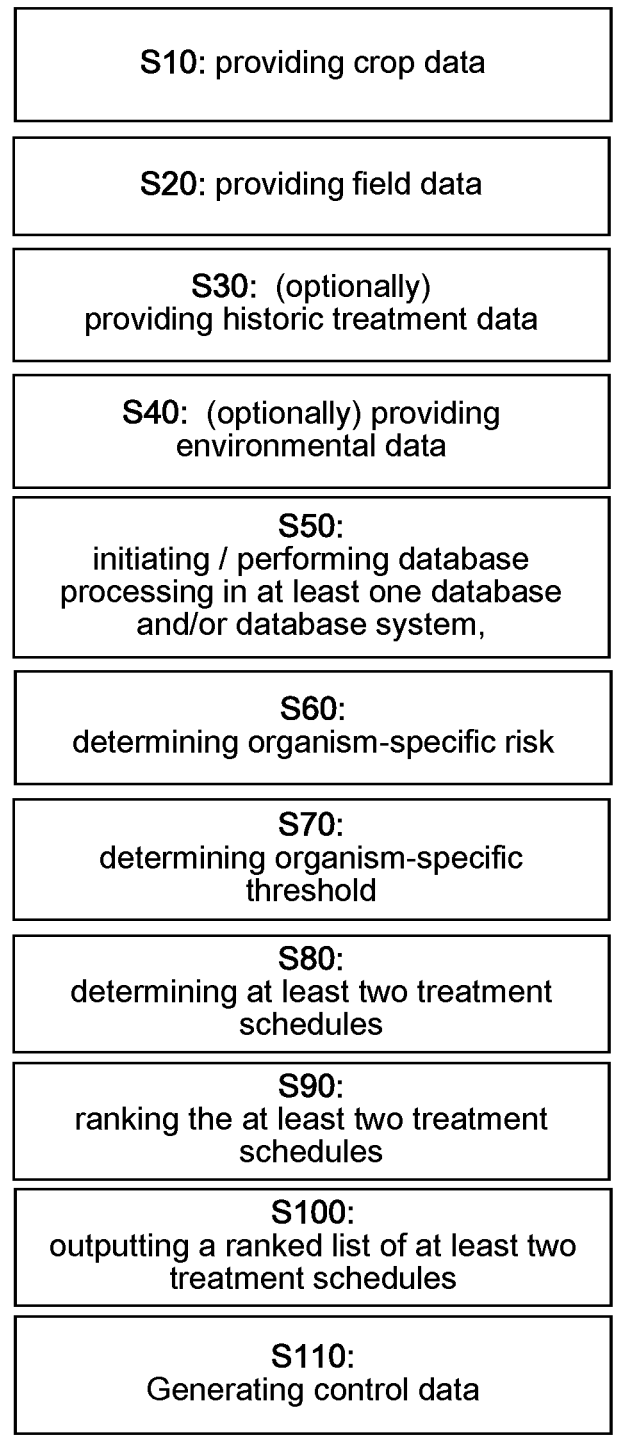
FIG. 1 is a schematic view of a method according to the preferred embodiment of the present invention.

FIG. 1 is a schematic view of a method according to the preferred embodiment of the present invention. In the following, an exemplary order of the steps according to the present invention is explained. However, the provided order is not mandatory, i.e. all or several steps may be performed in a different order or simultaneously. In step (S10), crop data are provided. In step
(S20) field are provided. In step (S30) historic treatment data are optionally provided. In step
(S40) environmental data are optionally provided. In step (S50), data processing in at least one database and/or database system containing
(i) data related to crop data,
(ii) data related to field data,
(iii) optionally data related to historic treatment data, and
(iv) optionally data related to environmental data, is initiated and/or performed at least based on the crop data and on the field data. In step (S60), the organism-specific risk based on the result of the data processing is determined. In step
(S70), the organism-specific threshold is determined or provided. In step (S80), at least two treatment schedules capable of targeting the at least one organism are determined, based on the organism-specific risk and the organism-specific threshold and based on the data processing in at least one treatment-related database, wherein the treatment schedule comprises:
(A) at least one treatment in a field, and
(B) at least one time window for each treatment, and
(C) at least one agricultural method and/or product used for each treatment. In step (S90), these at least two treatment schedules are ranked according to one or more of the statistics (Q1) to (Q28). In step (S100), a ranked list of the at least two treatment schedules is outputted. In step (S110), control data configured to be used or usable in an agricultural equipment are generated, wherein the control data is based on the highest ranked treatment schedule from the ranked list, or a treatment schedule selected by a user from the ranked list.

The present invention has been described in conjunction with a preferred embodiment as examples as well. However, other variations can be understood and effected by those persons skilled in the art and practicing the claimed invention, from the studies of the drawings, this disclosure and the claims. Notably, in particular the steps S10 to S40 can be performed in any order, i.e. the present invention is not limited to a specific order of these steps. Moreover, it is also not required that the different steps are performed at a certain place or at one place, i.e. each of the steps may be performed at a different place using different equipment/data processing units. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

REFERENCE SIGNS

S10 providing crop data
S20 providing field data
S30 optionally providing historic treatment data
S40 optionally providing environmental data
S50 initiating/performing database processing in at least one database and/or database system,
S60 determining organism-specific risk
S70 determining organism-specific threshold
S80 determining at least two treatment schedules
S90 ranking at least two treatment schedules
S100 outputting a ranked list,
S110 generating control data based on the highest ranked treatment schedule from the ranked list or based on the treatment schedule selected by a user from the ranked list.

FIG. 2

Figure 2:
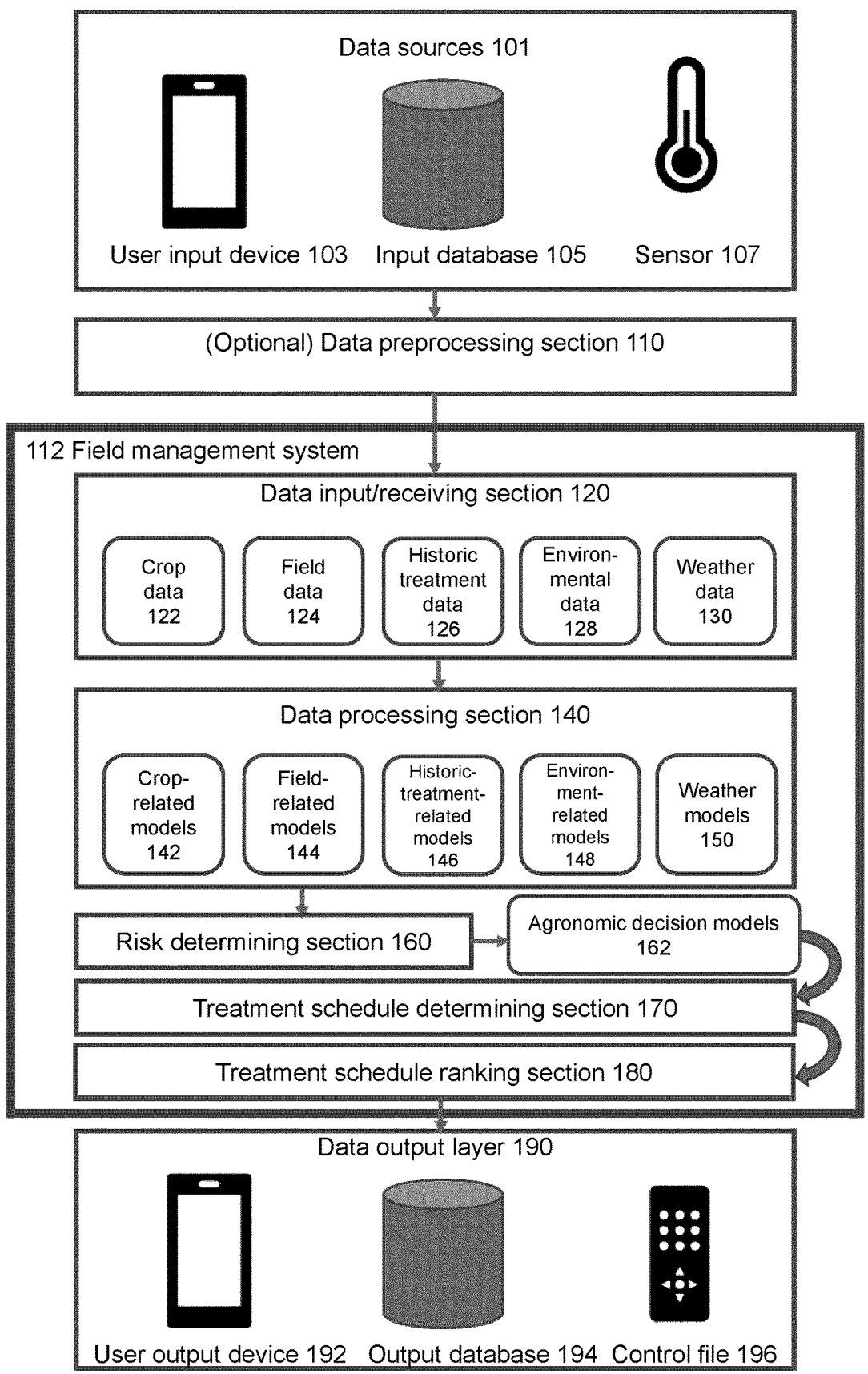
FIG. 2 is a schematic view of an embodiment of the data flow of the computer-implemented method of the present invention.

FIG. 2 illustrates an embodiment of the data flow of the computer-implemented method of the present invention.

In a first data flow section, data sources 101 are made available, wherein the data sources can be for example user device 103, database 105 and/or sensor 107. The term "user input device" is understood to be a computer, a smartphone, a tablet, a smartwatch, a monitor, a data storage device, or any other device, by which a user, including humans and robots, can input or transfer data to the field management system 112. The term "input database" is understood to be any organized collection of data, which can be stored and accessed electronically from a computer system, and from which data can be inputted or transferred to the field management system 112. The term "sensor" is understood to be any kind of physical or virtual device, module or machine capable of detecting or receiving real-world information and sending this real-world information to another system, including temperature sensor, humidity sensor, moisture sensor, pH sensor, pressure sensor, soil sensor, crop sensor, water sensor, and cameras.

In a further data flow section, data which originated from one of the data sources 101 are optionally preprocessed in the data preprocessing section 110, wherein such data preprocessing may include data calibration, data transformation (e.g. into a different format), data correction, data validation, and data verification.

In a further data flow section, which corresponds to the steps (S10), (S20), (S30) and (S40) of the computer-implemented method of the present invention, the data which originated from one of the data sources 101 and which has been optionally preprocessed in the data preprocessing section 110 are inputted, i.e. provided, into the field management system 112, for example as crop data 122, as field data 124, as historic treatment data 126, as environmental data 128, or as weather data 130.

In a further data flow section, which corresponds to the step (S50) of the computer-implemented method of the present invention, the above mentioned data are processed by the field management system in the data processing section 120 using for example one or more crop-related models 142, one or more field-related models 144, one or more historic-treatment-related models 146, one or more environment-related models 148, one or more weather models 150, or a combination of such models. Crop-related model 142 is an algorithm which is capable of determining, predicting and/or simulating crop species, crop phenology, crop growth, crop development and other crop related properties based on specific input data. Field-related model 144 is an algorithm which is capable of determining, predicting and/or simulating soil properties of a field, or other field related properties based on specific input data. Historic-treatment-related model 146 is an algorithm which is capable of determining, predicting and/or simulating the results, the consequences, the efficacy, or the performance of historic treatments based on specific input data. Environment-related model 148 is an algorithm which is capable of determining, predicting and/or simulating any environment-related parameters including its development, such as weather, climate change, emissions (including greenhouse gas emissions), soil properties, crop stress, biodiversity requirements, existence of protected or to-be-protected beneficial organisms, existence of protection zones, existence of buffer zones in which no or only limited amounts of chemicals or agrochemicals are allowed to be applied. Weather model 150 is an algorithm which is capable of determining, predicting and/or simulating any weather-related parameters including its development, such as temperature, precipitation, moisture, humidity, sunshine, or wind speed. Within the data processing section 120, the output of one of the above-mentioned model may also be directly used as input of another of the above mentioned models. Within the data processing section 120, at least two, preferably at least three of the above-mentioned models may also be run either in a parallel arrangement or in a sequential arrangement or in a combination of parallel and sequential arrangement.

In a further data flow section, which corresponds to the step (S60) of the computer-implemented method of the present invention, the final outputs of the above-mentioned model(s) in the data processing section 120 are transferred to the risk determining section 160, where the organism-specific risk is determined based on these outputs. The organism-specific risk is then transferred as input to agronomic decision models 162. Agronomic decision model 162 is an algorithm which is capable of determining and/or calculating products (particularly chemical crop protection products such as herbicides, fungicides, and insecticides), dosages, application methods, time windows, or other treatment parameters for achieving a specific real-world agronomic objective, particularly for achieving a real-world crop protection task such as weed control, fungi control or insect control, based on specific input data. The outputs of the agronomic decision model(s) are transferred to the treatment schedule determining section 170, where at least one, preferably at least two, more preferably at least three, most preferably at least four treatment schedules are determined based on the outputs of the agronomic decision model(s). Subsequently, in case at least two treatment schedules have been determined in treatment schedule determining section 170, these at least two treatment schedules are ranked according to the statistics (Q1) to (Q28) in the treatment schedule ranking section 180, preferably using a treatment schedule ranking model which calculates a ranking score for each of the at least two treatment schedules.

In a further data flow section, the final outputs of the treatment schedule ranking section 180 are transferred from the field management system to the data output layer 190 and for example outputted on a user device 192, in a output database 194 or as a control file 196. The term "user output device" is understood to be a computer, a smartphone, a tablet, a smartwatch, a monitor, a data storage device, or any other device, by which a user, including humans and robots, can receive data from the field management system 112. The term "output database" is understood to be any organized collection of data, which can be stored and accessed electronically from a computer system, and which can receive data which is outputted or transferred from the field management system 112. The term "control file" is understood to be any binary file, data, signal, identifier, code, image, or any other machine-readable or machine-detectable element useful for controlling a machine or device, for example an agricultural treatment device.

FIG. 3

Figure 3:
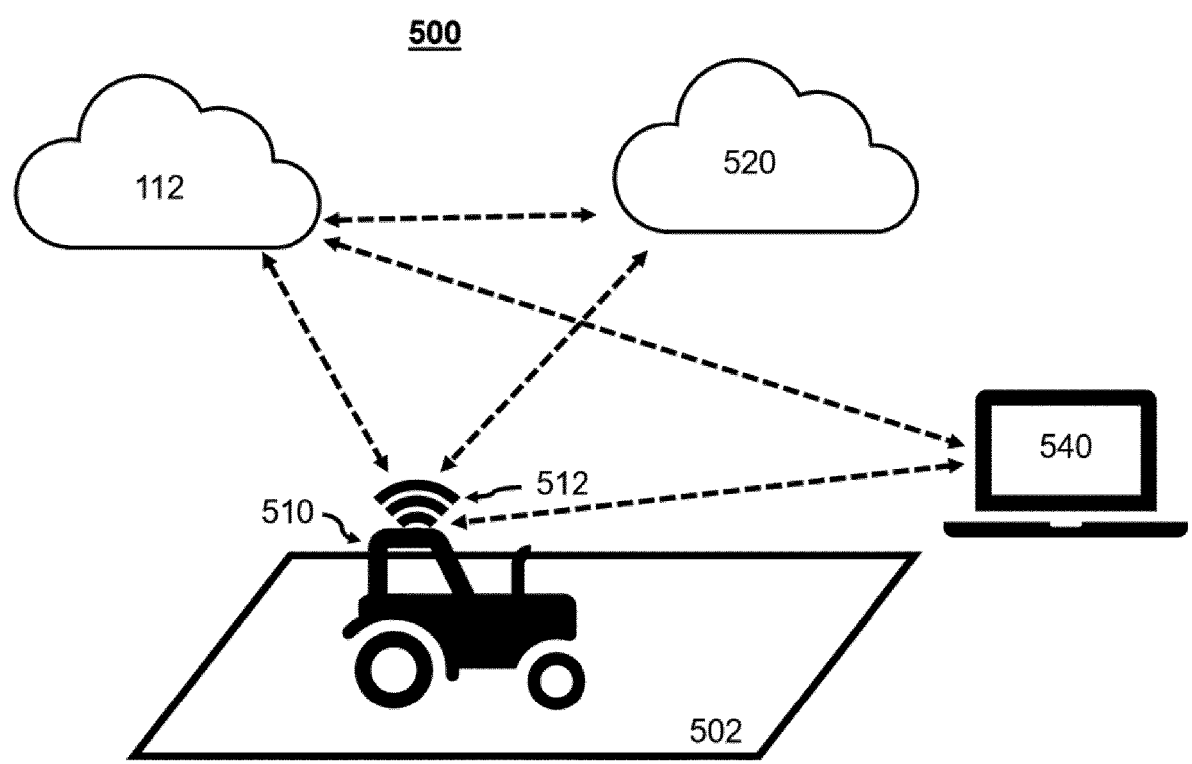
FIG. 3 is a schematic view of a treatment management system 500.

FIG. 3 schematically illustrates a treatment management system 500. The treatment parameters determined by the computer-implemented method of the present invention will be outputted or further processed as a control signal for an agricultural equipment embedded in the treatment management system 500, wherein the agricultural equipment is preferably a spraying device. The treatment management system 500 may comprise a movable agricultural equipment 510, a data management system 520, a field management system 112, and a client computer 540. The movable agricultural equipment 510 may be e.g. ground robots with variable-rate applicators, or other variable-rate applicators for applying crop protection products (particularly herbicides, fungicides, or insecticides) to the field 502.

In the example of FIG. 3, the movable agricultural equipment 510 is embodied as smart farming machinery. The smart farming machinery 510 may be a smart sprayer and includes a connectivity system 512. The connectivity system 512 may be configured to communicatively couple the smart farming machinery 510 to the distributed computing environment. It may be configured to provide data collected on the smart farming machinery 510 to the data management system 520, the field management system 112, and/or the client computer 540 of the distributed computing environment.

The data management system 520 may be configured to send data to the smart farming machinery 510 or to receive data from the smart farming machinery 510. For instance, as detected maps or as applied maps comprising data recorded during application on the field 502 may be sent from the smart farming machinery 510 to the data management system 520. For instance, the data management system 520 may comprise georeferenced data of different fields and the associated treatment map(s).

The field management system 520 may be configured to provide a control protocol, an activation code or a decision logic to the smart farming machinery 510 or to receive data from the smart farming machinery 510. Such data may also be received through the data management system 520.

The field computer 540 may be configured to receive a user input and to provide a field identifier and an optional treatment specifier to the field management system 112. Alternatively, the field identifier may be provided by the movable agricultural equipment 510. Alternatively, the optional treatment specifier may be determined using e.g. growth stage models, weather modelling, neighbouring field incidences, etc. The field management system 112 may search the corresponding agricultural field and the associated treatment map(s) in the data management system 520 based on the field identifier and the optional treatment specifier. The field computer 540 may be further configured to receive client data from the field management system 112 and/or the smart farming machinery 510. Such client data may include for instance application schedule to be conducted on certain fields with the smart farming machinery 510 or field analysis data to provide insights into the health state of certain fields.

The treatment device 510, the data management system 520, the field management system 112, and the client computer 540 may be associated with a network. For example, the network may be the internet. The network may alternatively be any other type and number of networks. For example, the network may be implemented by several local area networks connected to a wide area network. The network may comprise any combination of wired networks, wireless networks, wide area networks, local area networks, etc.

The data processing system of the present invention may be embodied as, or in, or as part of the field management system 112 to perform the above-described method to provide a control data to the smart farming machinery 510. For example, the field management system 112 may receive the spraying device configuration data from the movable agricultural equipment 510 via the connectivity system 512. The field management system 112 may receive geo-dependent environmental data (e.g. temperature, moisture, humidity, and/or wind speed) form one or more sensors installed on the movable agricultural equipment 510 to monitor environmental data. Alternatively or additionally, the field management system 112 may receive geo-dependent environmental data from weather services.

The overall technical advantage of the present invention lies in the fully-automated or semi-automated selection of the optimal treatment schedule—including the generation of control data based on this selection—before the season or before the treatment schedule needs to be carried out, potentially considering 28 different statistics including efficacy, environmental impact and flexibility of the treatment schedule.

The invention claimed is:

1. A method performed by a computing device for generating control data to operate an agricultural equipment for treating a field, the method comprising:
    receiving, by a processing unit, crop data comprising information about an agricultural crop species grown or sown or planned intended to be grown in a field;
    receiving field data information about the field;
    optionally receiving historic treatment data, wherein the historic treatment data comprise information about historic presence of an organism in the field or in a geographic region in which the field is located in the field, about treatment time, treatment-related parameters, organism control rate of treatments occurring or planned in the past;
    optionally receiving environmental data, wherein the environmental data comprise information about weather, soil, crop stress, biodiversity requirements, regulatory data, and other environmental factors;
    at least based on the crop data and on the field data, initiating and/or performing data processing, using a multi-source data integration model configured to generate a spatially-resolved, time-dependent risk prediction for at least one harmful organism, in at least one database and/or database system containing:
        (i) data related to the crop data,
        (ii) data related to the field data,
        (iii) optionally data related to the historic treatment data, and
        (iv) optionally data related to the environmental data,
    determining, by the computing device, an organism-specific risk based on a result of the data processing, wherein the organism-specific risk is a time-related occurrence probability of at least one organism present or expected to be present in a specific field;
    providing and/or determining an organism-specific threshold, wherein the organism-specific threshold is a reference value of the organism-specific risk and wherein at least one treatment is required in case the organism-specific risk exceeds the organism-specific threshold;
    determining, based on the organism-specific risk and the organism-specific threshold and based on the data processing in at least one treatment-related database, at least two treatment schedules capable of targeting the at least one organism, wherein each treatment schedule comprises:
        (A) at least one treatment in the field, and
        (B) at least one time window for each treatment, and
        (C) at least one agricultural method and/or product used for each treatment,
    ranking the at least two treatment schedules, based on one or more of the following statistics (Q1) to (Q28), using a machine-implemented scheduling optimization model:
        (Q1) Minimized number of treatments required,
        (Q2) Minimized number of products applied,
        (Q3) Minimized number of crop protection products and/or of active ingredients applied,
        (Q4) Minimized total dose or total amount of products,
        (Q5) Minimized total dose or total amount of crop protection products,
        (Q6) Minimized number of agricultural equipment required,
        (Q7) Minimized total use time of agricultural equipment required,
        (Q8) Minimized number of application methods applied,
        (Q9) Minimized number of days in which treatments are conducted,
        (Q10) Minimized total time in which treatments are conducted,
        (Q11) Minimized treatment frequency index,
        (Q12) Minimized environmental load (e-load) index,
        (Q13) Minimized impact to beneficial organisms,
        (Q14) a number of priority organisms targeted with an efficacy above a defined threshold, wherein the defined threshold is above 80% and wherein the defined threshold represents a most weighted statistic per treatment schedule;
        (Q15) a number of priority organisms targeted with an efficacy above a defined first threshold, weighted or combined with a number of non-priority organisms targeted with an efficacy above a defined second threshold,
        (Q16) a number of all organisms targeted with an efficacy above the defined threshold;
        (Q17) maximum efficacy achieved or expected to be achieved across organisms by a given crop protection product;
        (Q18) a fraction of crop protection product in a treatment schedule of known preferred usage at a time of application;
        (Q19) an expected or achieved efficacy sum of all crop protection products in a treatment schedule for priority organisms;
        (Q20) an expected or achieved efficacy sum of all crop protection products in a treatment schedule for all organisms;
        (Q21) if applicable, an average expected control of residual efficacy duration in soil;

(Q22) an index accounting for repeating a mode of action and/or active ingredient compared to previous applications,
(Q23) a duration of the at least one time window for each treatment,
(Q24) a postpone-ability of the at least one time window for each treatment,
(Q25) a prepone-ability of the at least one time window for each treatment,
(Q26) in case a corresponding treatment schedule comprises at least two treatments, a flexibility of leaving out one of the at least two treatments,
(Q27) degree of independency of an efficacy of the treatment schedule from previous or subsequent treatments,
(Q28) degree of independency of an efficacy of the treatment schedule from environmental and/or weather conditions,
outputting, by the computing device, a ranked list of the at least two treatment schedules; and
generating, by the computing device, machine-readable control data and controlling the agricultural equipment to automatically perform at least one treatment actions associated with a treatment schedule selected from the ranked list, wherein the machine-readable control data is based on a highest ranked treatment schedule from the ranked list, or a treatment schedule selected by a user from the ranked list.

2. The method according to claim 1, wherein the method further comprises the step of calculating statistics for each treatment schedule.

3. The method according to claim 2, wherein the wherein the ranking is based on one or more of the statistics (Q1) to (Q13) and based on one or more of the statistics (Q14) to (Q22).

4. The method according to claim 2, wherein the ranking is based on one or more of the statistics (Q23) to (Q28).

5. The method according to claim 2, wherein the ranking is based on one or more of the statistics (Q1) to (Q13) and/or based on one or more of the statistics (Q14) to (Q22) and based on one or more of the statistics (Q23) to (Q28).

6. The method according to claim 1, wherein at least one treatment schedule comprises at least two treatments.

7. The method according to claim 1, wherein at least one treatment schedule comprises at least two treatments wherein the at least one time window for the at least two treatments are not identical.

8. The method according to claim 1, wherein at least one treatment schedule comprises at least two treatments wherein the at least one agricultural method and/or product used for the at least two treatments are not identical.

9. The method according to claim 1, wherein at least one treatment schedule comprises at least two treatments wherein the at least one agricultural method and/or product used for the at least two treatments are not identical and wherein the at least one time window for the at least two treatments are not identical.

10. The method according to claim 1, wherein the treatment schedule comprises:
(A) the at least one treatment in the field, and
(B) the at least one time window for each treatment, and
(C) at least one crop protection product used for each treatment, and,
(D) at least one dosage or amount range of the at least one crop protection product used for each treatment.

11. The method according to claim 1, wherein the organism-specific risks for at least two organisms are determined.

12. The method according to claim 1, wherein the at least one organism is a harmful organism selected from the group consisting of weeds, fungi, viruses, bacteria, insects, arachnids, nematodes, mollusks, birds, and rodents.

13. The method according to claim 1, wherein the at least one organism is a weed.

14. The method according to claim 1, wherein the method further comprises the step of providing an application map by combining the field data and a treatment schedule.

15. A system for treating a field, comprising:
at least one processor configured to perform the steps of the method of claim 1 to generate the machine-readable control data; and
the agricultural equipment configured to receive the machine-readable control data and to automatically perform at least one field treatment operation based on the machine-readable control data.

16. A non-transitory computer-readable medium that comprising instructions that, when executed by a computer, cause the computer to implement the method according to claim 1.

* * * * *